(12) United States Patent
van Os et al.

(10) Patent No.: US 8,734,255 B2
(45) Date of Patent: May 27, 2014

(54) METHODS AND SYSTEMS FOR PROVIDING A GAME CENTER HAVING PLAYER SPECIFIC OPTIONS AND STATISTICS

(75) Inventors: Marcel van Os, San Francisco, CA (US); Mike Lampell, Woodside, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 12/886,505

(22) Filed: Sep. 20, 2010

(65) Prior Publication Data

US 2011/0250968 A1    Oct. 13, 2011

Related U.S. Application Data

(60) Provisional application No. 61/321,861, filed on Apr. 7, 2010, provisional application No. 61/378,886, filed on Aug. 31, 2010.

(51) Int. Cl.
A63F 13/12 (2006.01)

(52) U.S. Cl.
USPC .......................................................... 463/42

(58) Field of Classification Search
CPC .................. A63F 2300/5546; A63F 2300/556
USPC .................................................... 463/42, 43
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 6,699,125 B2 | 3/2004 | Kirmse et al. |
| 7,214,133 B2 | 5/2007 | Jen et al. |
| 7,311,608 B1 | 12/2007 | Danieli et al. |
| 7,549,924 B2 | 6/2009 | Canessa et al. |

(Continued)

FOREIGN PATENT DOCUMENTS

| | | |
|---|---|---|
| EP | 1 371 403 A2 | 12/2003 |
| EP | 2 008 696 A1 | 12/2008 |
| WO | WO-2006/124922 A2 | 11/2006 |
| WO | WO-2009/153910 | 12/2009 |

OTHER PUBLICATIONS

International Search Report and Written Opinion of the International Search Authority for PCT/US2010/050069, mailed Dec. 29, 2010, pp. 7 total.

(Continued)

*Primary Examiner* — Dmitry Suhol
*Assistant Examiner* — Jay Trent Liddle
(74) *Attorney, Agent, or Firm* — Blakely, Sokoloff, Taylor & Zafman LLP

(57) ABSTRACT

Described herein are methods and systems for providing a game center having player specific options and statistics. For example, in at least certain embodiments, a game center module can provide a friends option such that a user can view and select from a list of friends. The game center module can provide friend details of a selected friend including a list of games played together between the user and the selected friend and a list of other games in common between the user and the selected friend. In an embodiment, the list of games in common and the list of other games in common each include a list of options with each option indicating a respective game name and a comparison of the user's ranking and the selected friend's ranking for the respective game.

29 Claims, 38 Drawing Sheets

(56) References Cited

U.S. PATENT DOCUMENTS

| | | | |
|---|---|---|---|
| 7,640,300 B2 | 12/2009 | Wohlgemuth et al. | |
| 7,677,970 B2 * | 3/2010 | O'Kelley et al. | 463/25 |
| 7,819,749 B1 | 10/2010 | Fish et al. | |
| 7,828,661 B1 * | 11/2010 | Fish et al. | 463/42 |
| 7,867,094 B1 | 1/2011 | Wisdom et al. | |
| 7,887,419 B2 | 2/2011 | Bortnik et al. | |
| 7,937,440 B2 | 5/2011 | Lee et al. | |
| 8,066,568 B2 | 11/2011 | O'Kelley, II et al. | |
| 8,142,282 B2 | 3/2012 | Canessa et al. | |
| 8,195,809 B2 | 6/2012 | Langan et al. | |
| 2002/0015024 A1 | 2/2002 | Westerman et al. | |
| 2002/0096831 A1 | 7/2002 | Nakayama et al. | |
| 2003/0074323 A1 | 4/2003 | Catan | |
| 2003/0190960 A1 * | 10/2003 | Jokipii et al. | 463/42 |
| 2004/0128250 A1 | 7/2004 | Fox et al. | |
| 2004/0128319 A1 | 7/2004 | Davis et al. | |
| 2004/0152517 A1 | 8/2004 | Hardisty et al. | |
| 2004/0192440 A1 | 9/2004 | Evans et al. | |
| 2004/0224772 A1 | 11/2004 | Canessa et al. | |
| 2005/0239550 A1 * | 10/2005 | Hardisty et al. | 463/42 |
| 2006/0063590 A1 | 3/2006 | Abassi et al. | |
| 2006/0089978 A1 | 4/2006 | Lee et al. | |
| 2006/0121991 A1 | 6/2006 | Borinik et al. | |
| 2006/0135264 A1 | 6/2006 | Shaw et al. | |
| 2006/0223600 A1 | 10/2006 | Wisdom et al. | |
| 2006/0287096 A1 * | 12/2006 | O'Kelley et al. | 463/42 |
| 2006/0287099 A1 | 12/2006 | Shaw et al. | |
| 2006/0287106 A1 | 12/2006 | Jensen et al. | |
| 2007/0117629 A1 | 5/2007 | Fowler et al. | |
| 2007/0123353 A1 | 5/2007 | Smith | |
| 2007/0173321 A1 * | 7/2007 | Shen et al. | 463/40 |
| 2007/0173323 A1 | 7/2007 | Johnson et al. | |
| 2007/0173325 A1 | 7/2007 | Shaw et al. | |
| 2007/0173327 A1 | 7/2007 | Kilgore et al. | |
| 2007/0218997 A1 | 9/2007 | Cho | |
| 2008/0113805 A1 * | 5/2008 | David et al. | 463/42 |
| 2008/0176655 A1 | 7/2008 | James et al. | |
| 2009/0024933 A1 | 1/2009 | Smedley et al. | |
| 2009/0075738 A1 * | 3/2009 | Pearce | 463/42 |
| 2009/0082101 A1 | 3/2009 | Ostergren et al. | |
| 2009/0098918 A1 | 4/2009 | Teasdale et al. | |
| 2009/0104956 A1 | 4/2009 | Kay et al. | |
| 2009/0111576 A1 | 4/2009 | Ostergren et al. | |
| 2009/0176557 A1 | 7/2009 | Hall et al. | |
| 2009/0239666 A1 | 9/2009 | Hall et al. | |
| 2009/0264202 A1 | 10/2009 | Chen et al. | |
| 2009/0325712 A1 | 12/2009 | Rance | |
| 2010/0029386 A1 | 2/2010 | Pitsch et al. | |
| 2010/0180211 A1 | 7/2010 | Boyd | |
| 2010/0203971 A1 | 8/2010 | Ealey | |
| 2010/0216553 A1 | 8/2010 | Chudley et al. | |
| 2011/0119706 A1 | 5/2011 | Scott et al. | |
| 2011/0248992 A1 | 10/2011 | van Os et al. | |
| 2011/0252079 A1 | 10/2011 | Werner et al. | |
| 2011/0252099 A1 | 10/2011 | Pattekar et al. | |
| 2011/0252144 A1 | 10/2011 | Tung et al. | |
| 2011/0252145 A1 | 10/2011 | Lampell et al. | |
| 2011/0252238 A1 | 10/2011 | Abuan et al. | |
| 2011/0252344 A1 | 10/2011 | van Os | |
| 2012/0011189 A1 | 1/2012 | Werner et al. | |

OTHER PUBLICATIONS

International Preliminary Report on Patentability for PCT/US2010/050069, mailed Oct. 9, 2012, 4 pages.

* cited by examiner

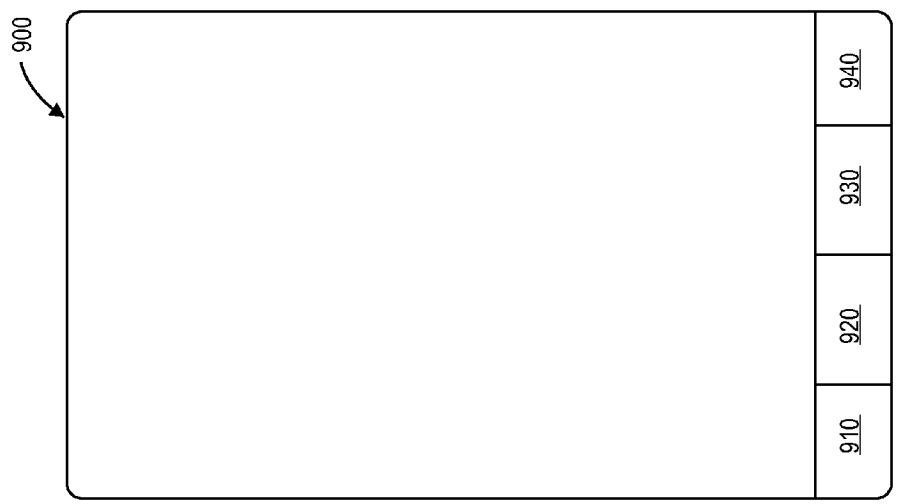

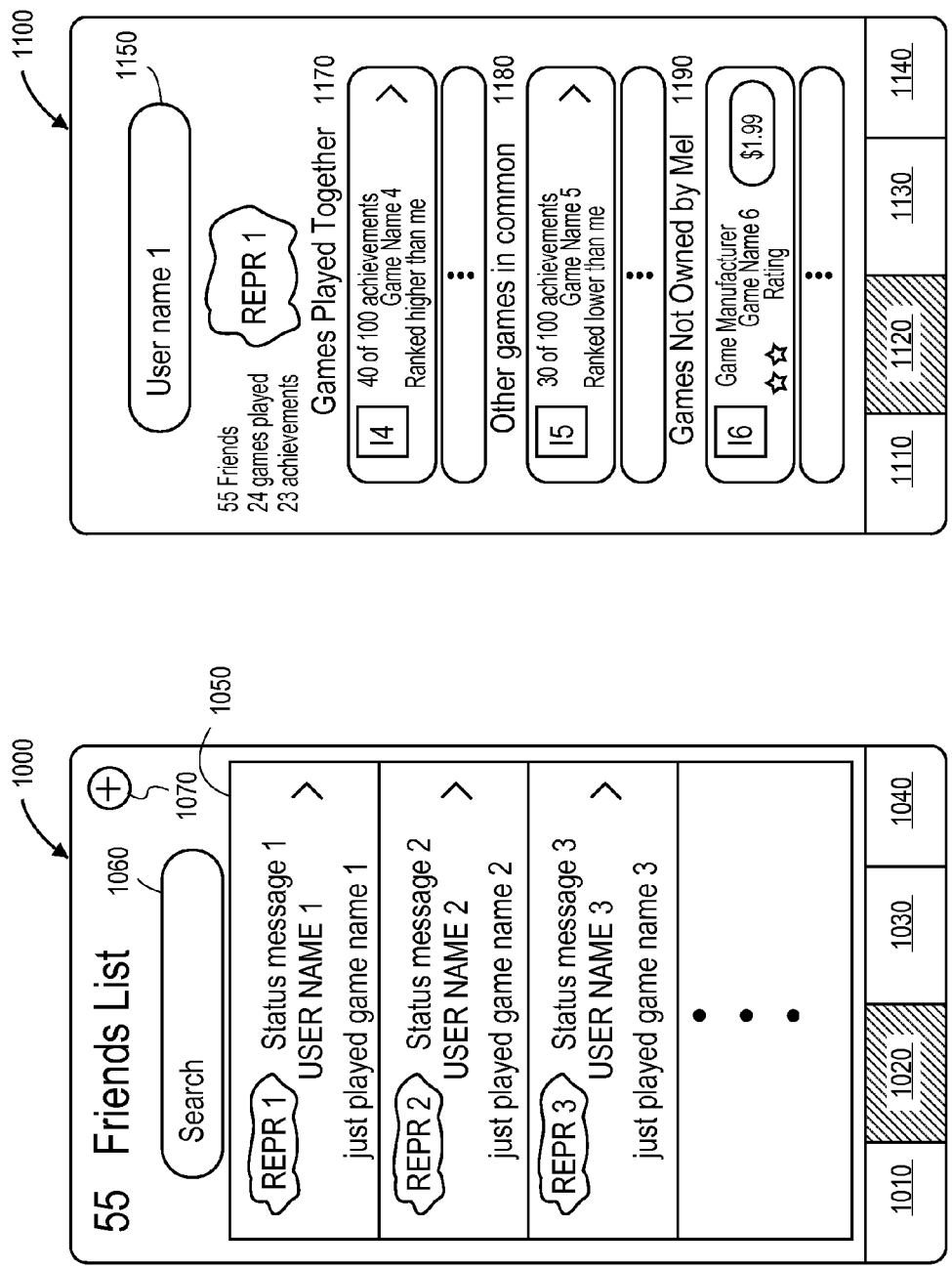

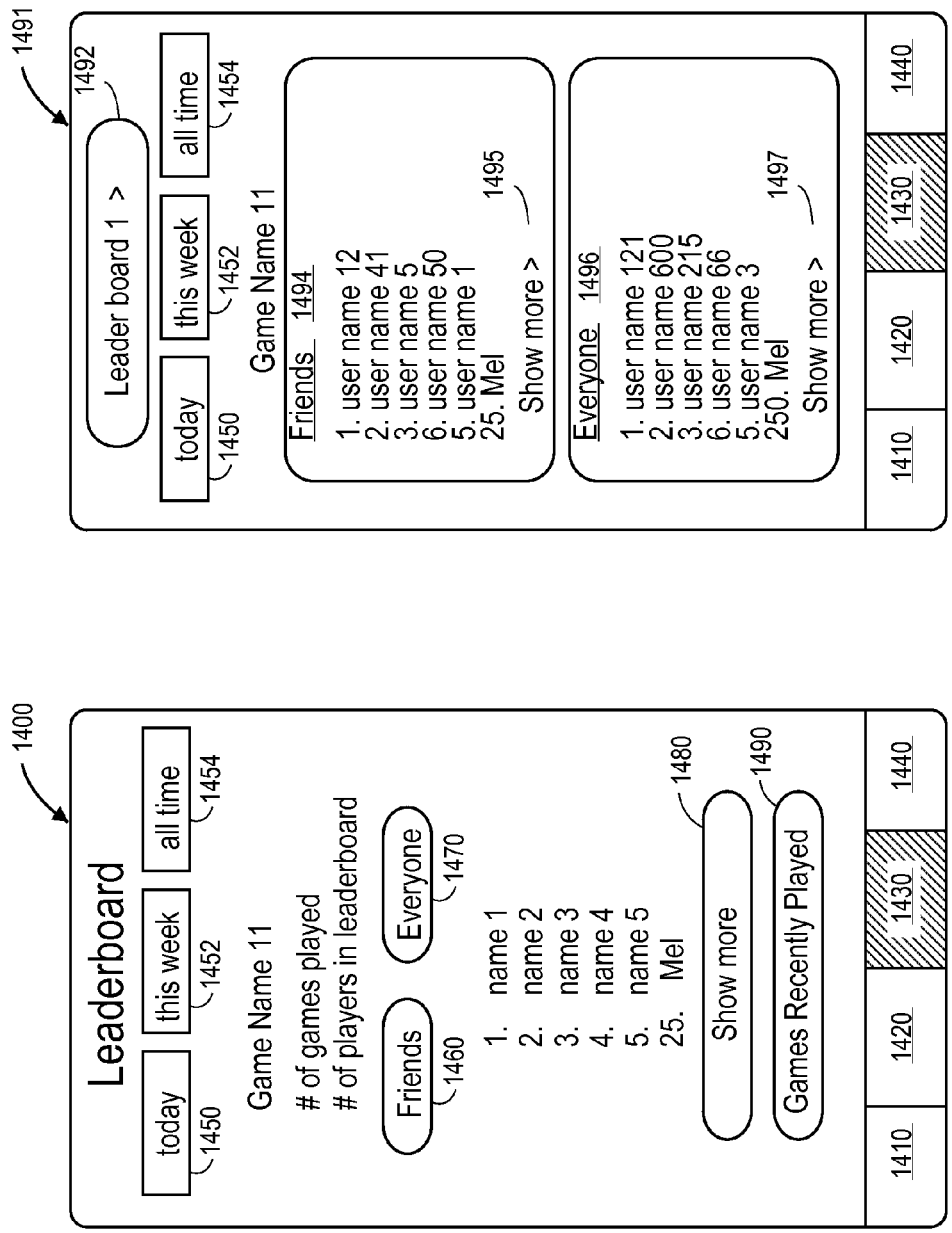

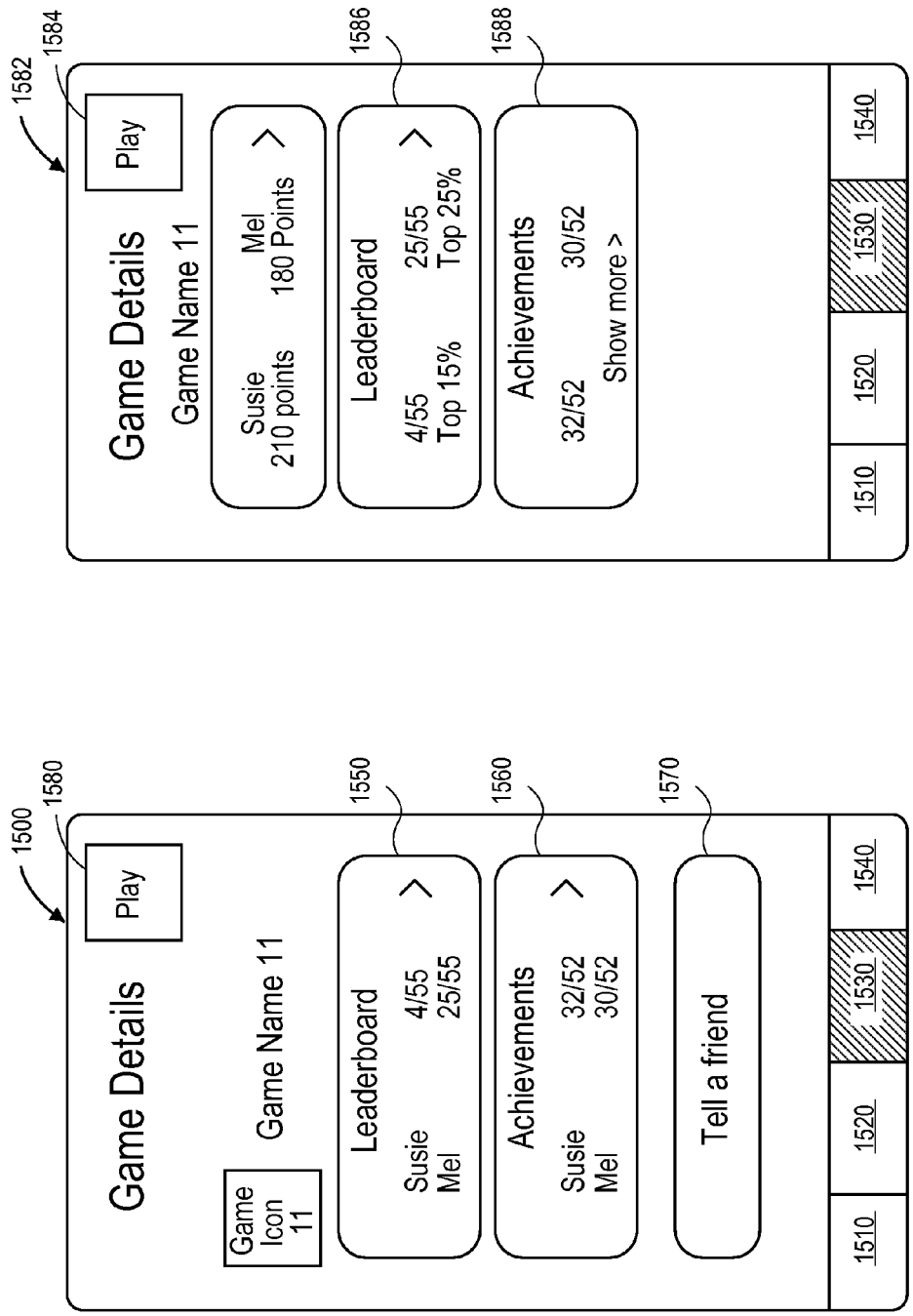

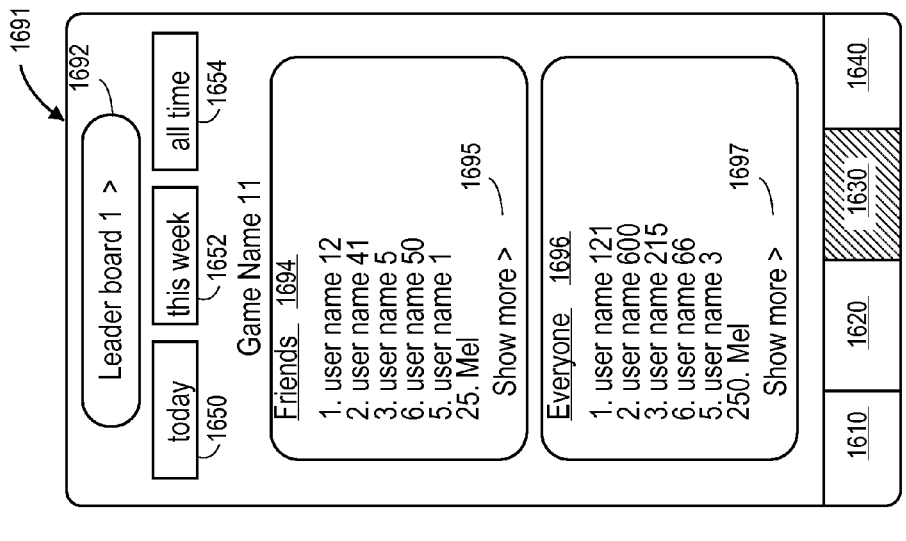
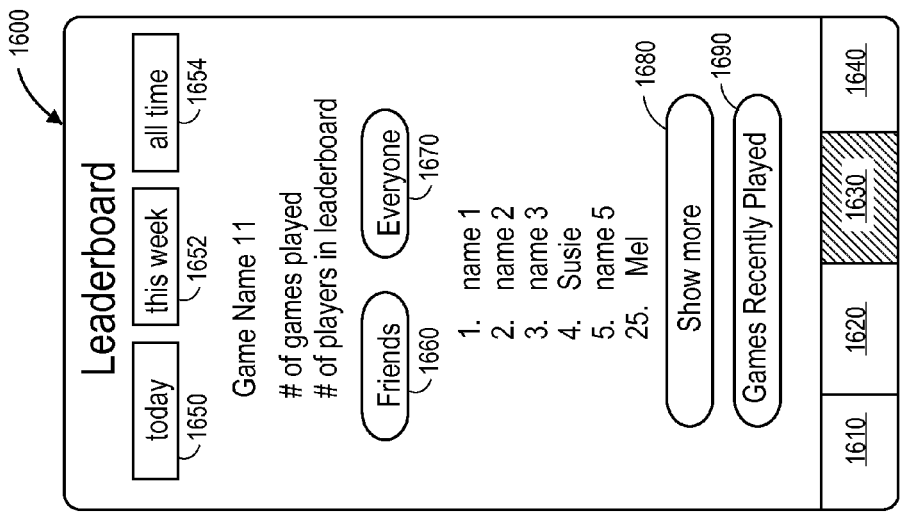

FIG. 18B

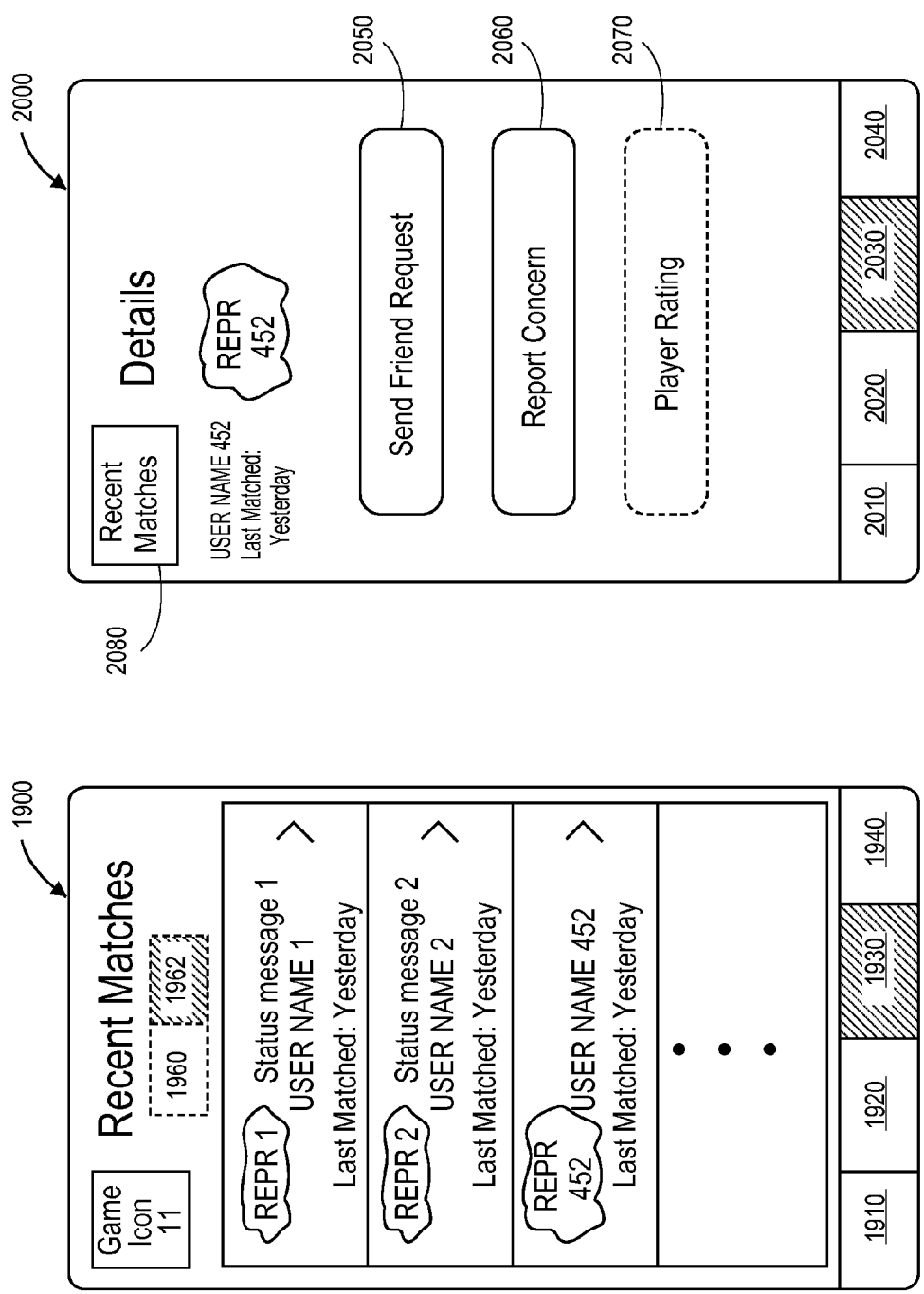

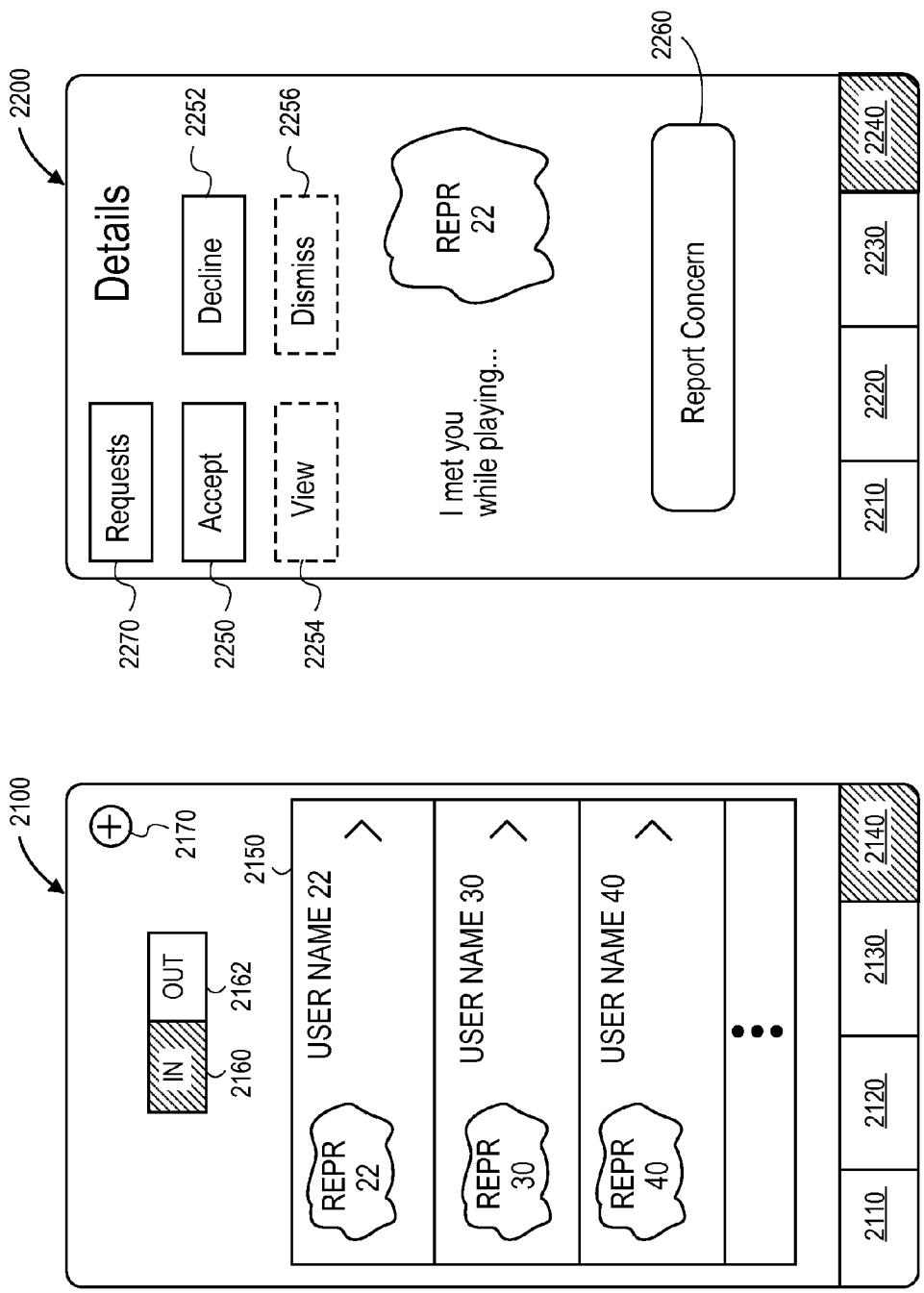

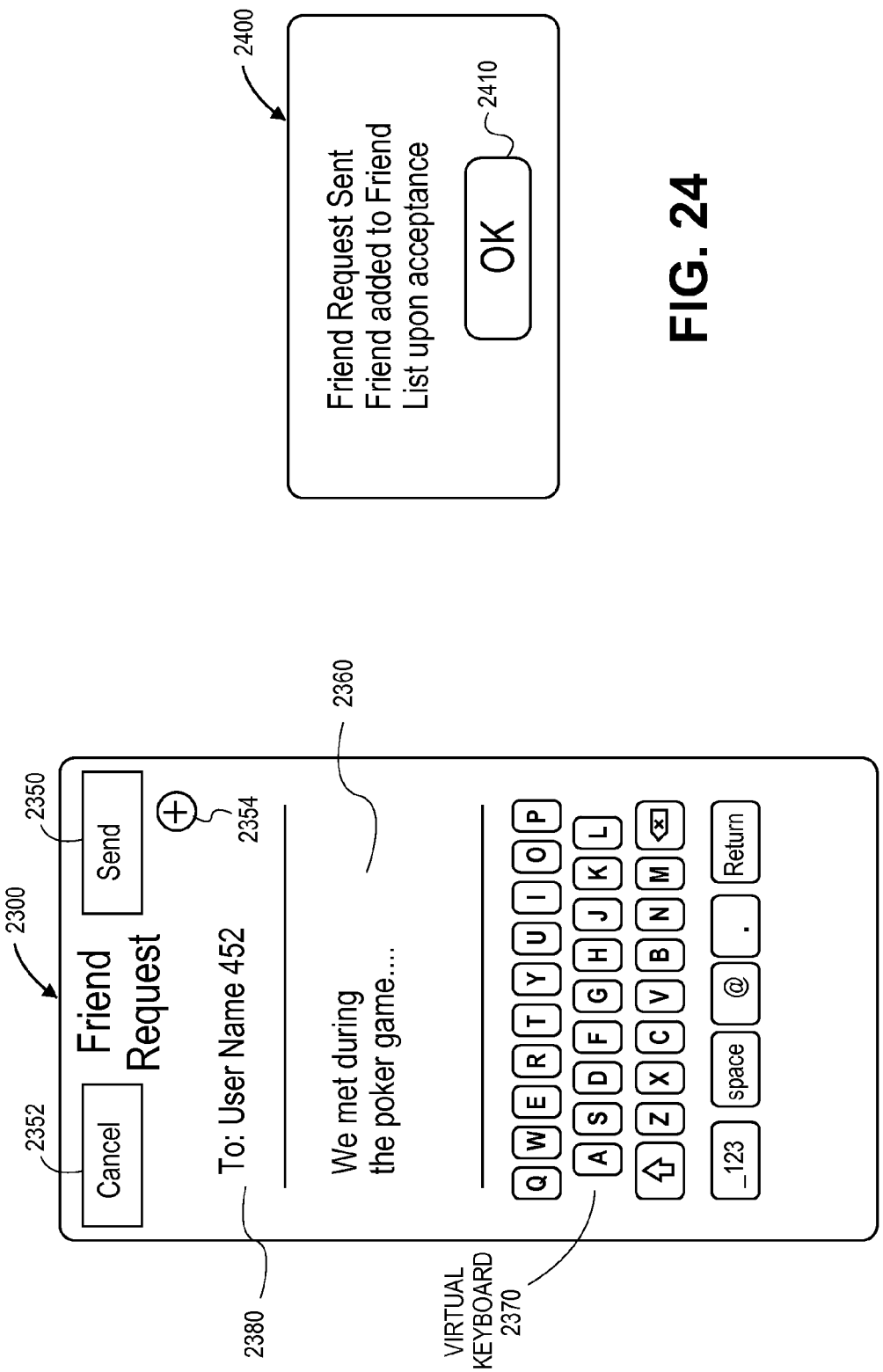

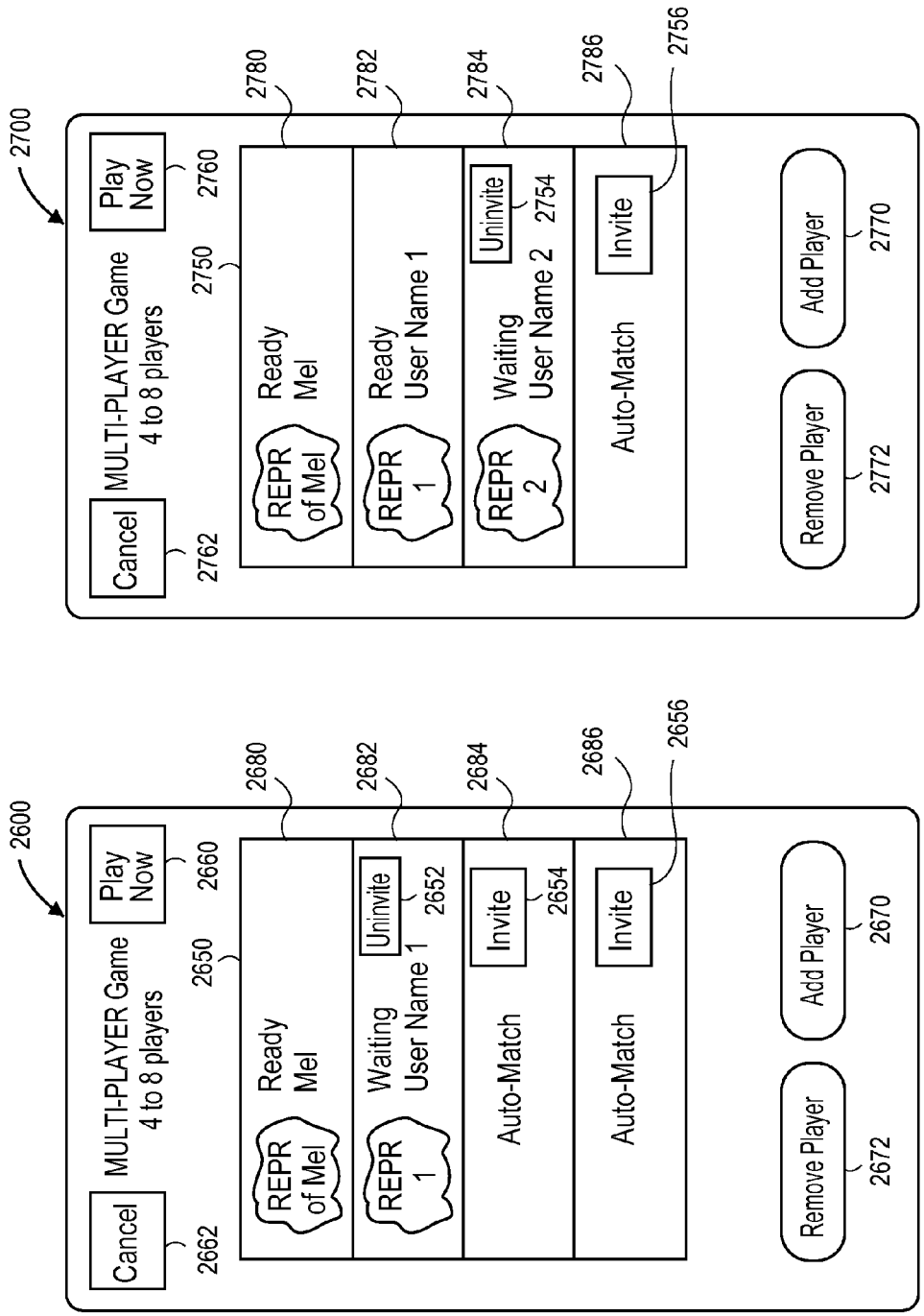

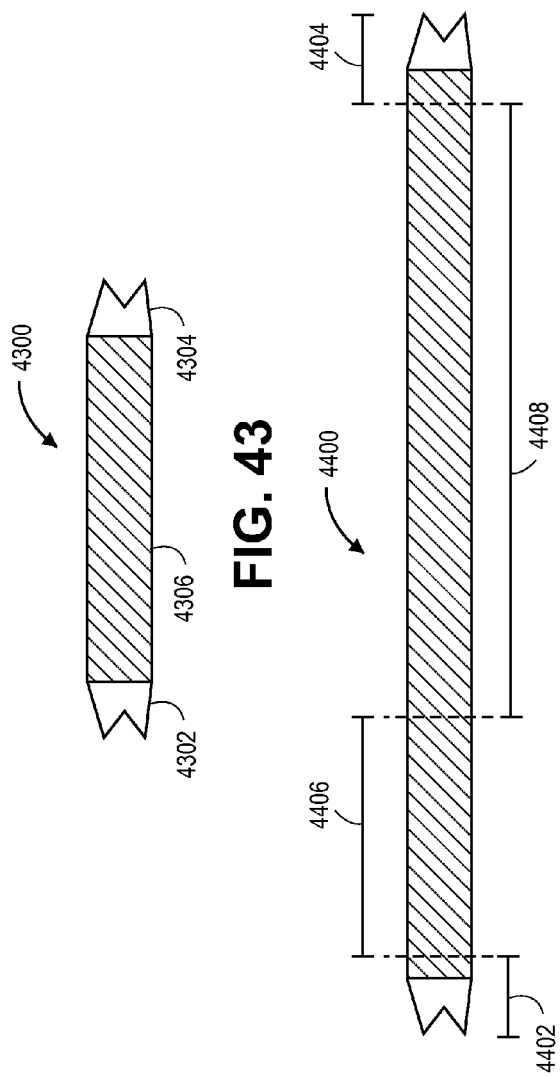
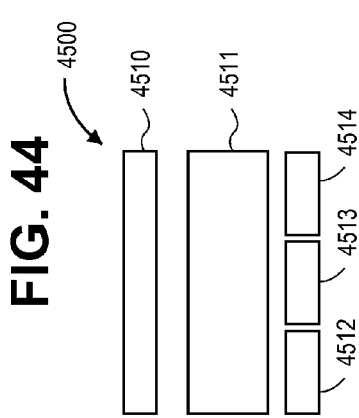

METHODS AND SYSTEMS FOR PROVIDING A GAME CENTER HAVING PLAYER SPECIFIC OPTIONS AND STATISTICS

CLAIM TO PRIORITY

This application claims the benefit of commonly assigned U.S. Patent Application No. 61/321,861 entitled "SYSTEMS AND METHODS FOR PROVIDING A GAME CENTER" filed on Apr. 7, 2010 by Marcel van Os, and commonly assigned U.S. Patent Application No. 61/378,886 entitled "METHODS AND SYSTEMS FOR PROVIDING A GAME CENTER" filed on Aug. 31, 2010 by Marcel van Os, the disclosures of which are hereby expressly incorporated herein by reference.

The invention to be disclosed and claimed in this application was prematurely and without Apple's authorization disclosed to the public when a prototype of Apple's iPhone 4 was apparently stolen from an Apple engineer on Mar. 25, 2010. The U.S. priority applications, on which this application is based, were not filed before the apparent theft.

TECHNICAL FIELD

Embodiments of the present invention relate to systems and methods that provide a game center having player specific options and statistics for gaming applications.

BACKGROUND

Various devices such as electronic devices, computing systems, portable devices, and handheld devices have software gaming applications. These devices can network with each other for a multi-player gaming experience.

One prior gaming device allows players to interact with each other online. This gaming device allows the sharing of a game and accomplishments between players. A user with a game console accesses an online game service to share the gaming experience with other players.

However, this prior approach has limitations in terms of connecting players, playing games with other players, and tracking player performance.

SUMMARY

Described herein are methods and systems for providing a game center. For example, in at least certain embodiments, a game center module provides a game center having player specific options and statistics. The game center module can provide a friends option such that a user can view and select from a list of friends. The game center module can provide friend details of a selected friend including a list of games played together between the user and the selected friend and another list of other games in common between the user and the selected friend.

In one embodiment, the list of games played together includes a list of options with each option indicating a respective game name and a comparison of the user's ranking and the selected friend's ranking for the respective game. The list of other games in common includes a list of options with each option indicating a respective game name and a comparison of the user's ranking and the selected friend's ranking for the respective game. Upon selection of an option from the list of games played together or the list of game in common the game center module may provide game details regarding the selected game and a leaderboard option. Selection of the leaderboard option causes the generation of a leaderboard that includes rankings for top players, the user, and optionally the selected friend for the selected game.

The present disclosure includes systems and devices that perform these methods, including data processing systems which perform these methods, and machine readable media which when executed on data processing systems cause the systems to perform these methods.

BRIEF DESCRIPTION OF THE DRAWINGS

The present invention is illustrated by way of example, and not by way of limitation, in the figures of the accompanying drawings and in which:

FIG. 9A illustrates an exemplary user interface 900 that is generated upon initiation of the game center module in one embodiment of the present invention;

FIG. 10 illustrates an exemplary user interface 1000 having a list of friends 1050 in one embodiment of the present invention;

FIG. 11A illustrates an exemplary user interface 1100 having friend details of a particular friend in one embodiment of the present invention;

FIG. 14A illustrates an exemplary user interface 1400 having a leaderboard in one embodiment of the present invention;

FIG. 14B illustrates an exemplary user interface 1491 having a leaderboard in one embodiment of the present invention;

FIG. 15A illustrates an exemplary user interface 1500 having game details for a specific game in one embodiment of the present invention;

FIG. 15B illustrates an exemplary user interface 1582 having game details for a specific game in one embodiment of the present invention;

FIG. 16A illustrates an exemplary user interface 1600 having a leaderboard in one embodiment of the present invention;

FIG. 16B illustrates an exemplary user interface 1691 having a leaderboard in one embodiment of the present invention;

FIG. 18B illustrates an exemplary user interface 1850 having achievements in one embodiment of the present invention;

FIG. 19 illustrates an exemplary user interface 1900 having recent players from recent matches with the user in one embodiment of the present invention;

FIG. 20 illustrates an exemplary user interface 2000 having details for a player from recent matches in one embodiment of the present invention;

FIG. 21 illustrates a an exemplary user interface 2100 having list of notifications (e.g., friend requests, updates) in one embodiment of the present invention;

FIG. 22 illustrates an exemplary user interface 2200 having details for a received friend request in one embodiment of the present invention;

FIG. 23 illustrates an exemplary user interface 2300 having a friend request communication in one embodiment of the present invention;

FIG. 24 illustrates an alert message in one embodiment of the present invention;

FIGS. 25-27 illustrate user interfaces provided by a game center module during a multi-player gaming experience in one embodiment of the present invention;

FIG. 43 illustrates a desired object 4300 having texture in one embodiment of the present invention;

FIG. 44 illustrates a template object 4400 in one embodiment of the present invention;

FIG. 45 illustrates an exemplary user interface having an exemplary form 4500 with various input fields 4510-4514 in one embodiment of the present invention.

DETAILED DESCRIPTION

Described herein are methods and systems for providing a game center having player specific options and statistics. For example, in at least certain embodiments, a game center module located on a system provides the game center. The game center may be a central area in a gaming system that provides information for numerous games, clients, players, etc., or any combination thereof. The games can be educational, have utility, provide entertainment, or be any category of software applications provided by an application service (e.g., application store).

The game center module can provide a friends option such that a user can view and select from a list of friends. The game center module can provide friend details of a selected friend including a list of games played together between the user and the selected friend and another list of other games in common between the user and the selected friend.

In one embodiment, the list of games played together includes a list of options with each option indicating a respective game name and a comparison of the user's ranking and the selected friend's ranking for the respective game. The list of other games in common includes a list of options with each option indicating a respective game name and a comparison of the user's ranking and the selected friend's ranking for the respective game. Upon selection of an option from the list of games played together or the list of game in common the game center module may provide game details regarding the selected game and a leaderboard option. Selection of the leaderboard option causes the generation of a leaderboard that includes rankings for top players, the user, and optionally the selected friend for the selected game.

Figure 1:
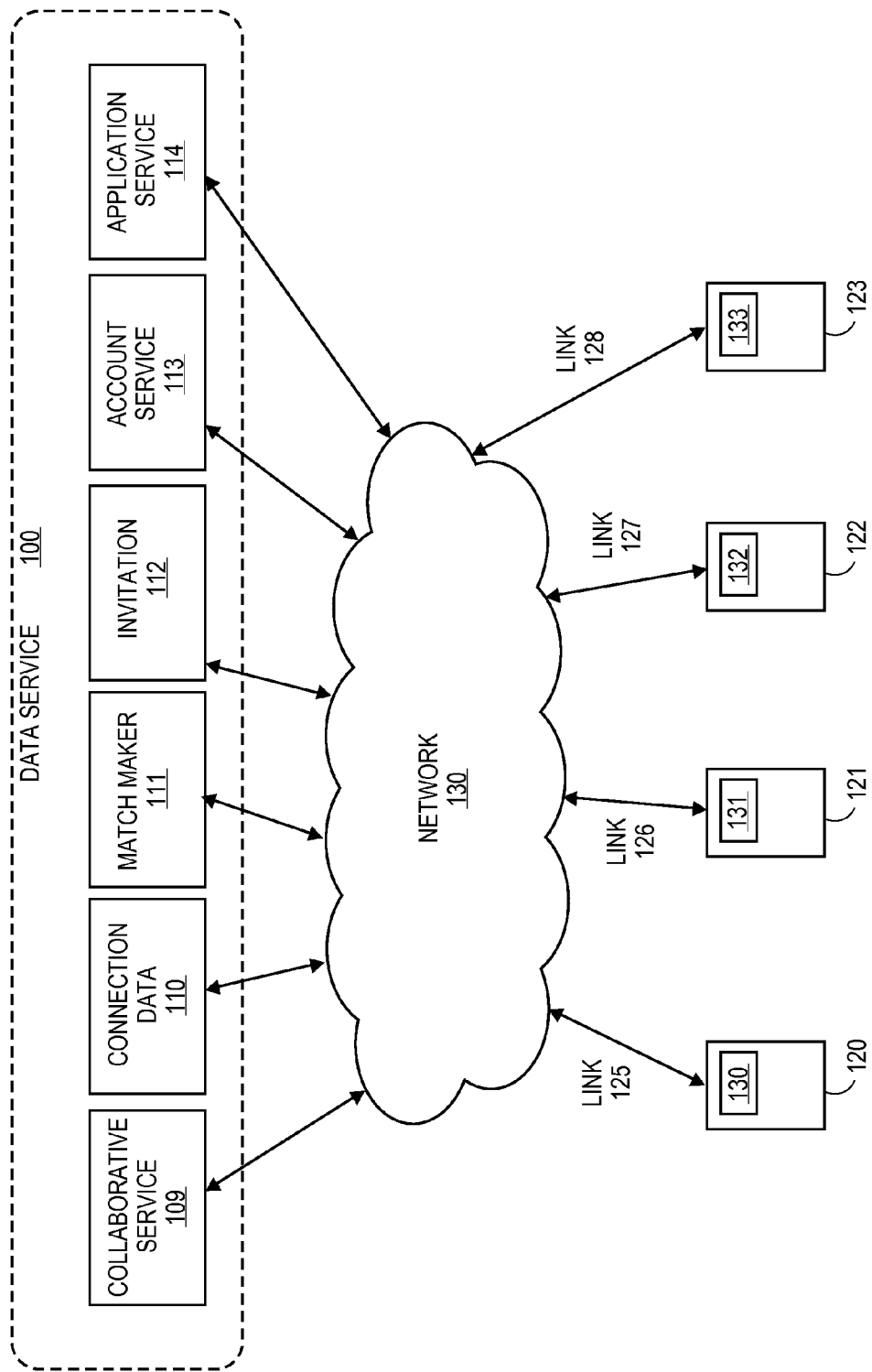
FIG. 1 illustrates a functional block diagram of a game center module for managing a game center in one embodiment of the present invention.

As illustrated in FIG. 1, a general network topology implemented in one embodiment of the present invention can include a group of "client" or "peer" computing systems 120-123, respectively, communicating with one another and with one or more services 109-114 over a network 130. Although illustrated as a single network cloud in FIG. 1, the "network" 130 can be comprised of a variety of different components including public networks such as the Internet and private networks such as local Wi-Fi networks (e.g., 802.11n home wireless networks or wireless hotspots), local area Ethernet networks, cellular data networks, and WiMAX networks, to name a few. For example, system 120 may be connected to a home Wi-Fi network represented by network link 125, system 121 may be connected to a 3G network (e.g., Universal Mobile Telecommunications System ("UMTS"), High-Speed Uplink Packet Access ("HSUPA"), etc) represented by network link 126, system 122 may be connected to a WiMAX network represented by network link 127, and system 123 may be connected to a public Wi-Fi network represented by network link 128. Each of the local network links 125-128 over which the systems 120-123 are connected may be coupled to a public network such as the Internet, thereby enabling communication between the various systems 120-123 over the public network. However, if two systems are on the same local or private network (e.g., the same Wi-Fi network), then the two systems may communicate directly over that local/private network, bypassing the public network. It should be noted, of course, that the underlying principles of the present disclosure are not limited to any particular set of network types or network topologies.

Each of the systems 120-123 illustrated in FIG. 1 can communicate with a data service 100 that may include a collaborative service 109 (e.g., game service, music creation service, document creation service), a connection data exchange (CDX) service 110, a matchmaker service 111, an invitation service 112, an account service 113, and an application service 114. In one embodiment, the collaborative service 109 enables users to collaborate with collaborative applications. For example, the collaborative service 109 may be a game service that enables users to collaborate for multi-player gaming applications. The game service may include or access any of the services 110-114 to provide a game center. The game service may include or access any of the services 110-114. For example, the game service may include services 111 and 112. The services 109-114 can be implemented as software executed across one or more physical computing systems such as servers. As shown in FIG. 1, in one embodiment, the services may be implemented within the context of a larger data service 100 managed by the same entity (e.g., the same company) and accessible by each of the systems 120-123 over the network 130. The data service 100 can include a local area network (e.g., an Ethernet-based LAN) connecting various types of servers, a storage area networks ("SANs") and databases. In one embodiment, the databases store and manage data related to each of the user systems (e.g., client systems, computer systems, mobile systems) 120-123 and the users of those systems (e.g., user account data, system account data, user application data, etc.).

In one embodiment, a game center module 130-133 is located on each system 120-123. The game center module is associated with a game center software application that manages a game center in conjunction with the game service. The game center module includes sub-modules (e.g., profile, friends, games, notifications) for managing the game center and providing the gaming experience for multi-player gaming.

In one embodiment, the game center module 130-133 is implemented on a game framework such as that described in co-pending applications U.S. patent application No. 61/321,854, entitled "APPLICATION PROGRAMMING INTERFACE, SYSTEM AND METHOD FOR COLLABORATIVE ONLINE APPLICATIONS," Filed Apr. 7, 2010 by Mike Lampell; U.S. patent application No. 61/321,842, entitled "APPARATUS AND METHOD FOR MATCHING USERS FOR ONLINE SESSIONS", Filed Apr. 7, 2010 by Jeremy Werner, Phillip Smith, Andrew H. Vyrros; U.S. patent application No. 61/321,832, entitled "APPARATUS AND METHOD FOR INVITING USERS TO ONLINE SESSIONS", Filed Apr. 7, 2010 by Andrew H. Vyrros, Jeremy Werner, and Patrick Gates; U.S. patent application No. 61/321,841, entitled "APPARATUS AND METHOD FOR ESTABLISHING AND UTILIZING BACKUP COMMUNICATION CHANNELS", Filed Apr. 7, 2010 by Jeff Tung, Barry A. Whitebook, Joe Abuan, Hyeonkuk Jeong, Andy Yang, and Roberto Garcia; and U.S. patent application No. 61/321,851, entitled "APPARATUS AND METHOD FOR EFFICIENTLY AND SECURELY EXCHANGING CONNECTION DATA", Filed Apr. 7, 2010 by Joe Abuan, Jeff Tung, Robert Quattlebaum, Barry A. Whitebook, and Roberto Garcia (hereinafter "Co-pending Applications"), which are assigned to the assignee of the present application and which are incorporated herein by reference. It should be noted, however, that the game framework described in the co-pending applications is not required for complying with the underlying principles of the invention. Additionally, in one embodiment, the friend service operations described herein (e.g., displaying friends lists, sending/receiving friend requests, etc) are managed by the friend service described in the co-pending application U.S. patent application No. 61/321,848, entitled "APPARATUS AND METHOD FOR EFFICIENTLY MANAGING DATA IN A SOCIAL NETWORKING SERVICE", Filed Apr. 7, 2010 by Amol Pattekar, Jeremy Werner, and Patrick Gates, (hereinafter "Friend Service Application"), which is incorporated herein by reference.

For example, in one embodiment of the present invention, each user is identified within the friend service by either a unique destination signaling identifier ("DSID") or a unique handle. In one embodiment, a DSID is used to identify users who are known to have accounts on the friend service. These users are sometimes referred to as "in-network users." A handle can be used to identify users who are not known to have accounts on the friend service 100. These users are sometimes referred to as "out-of-network users." This may include users who have not yet registered an account on the friend service and/or users who have an account on the friend service but who have not yet associated a particular handle with their account.

A "friend" may be defined as a user having an account that is associated or linked with an account from another user. More details in regards to the friends service operations and defining a "friend" are described in the co-pending Friend Service Application.

The matchmaker service 111 can match two or more systems for a collaborative peer to peer (P2P) session based on a specified set of conditions. For example, users of two or more of the systems may be interested in playing a particular multi-player game. In such a case, the matchmaker service 111 may identify a group of systems to participate in the game based on variables such as each user's level of expertise, the age of each of the users, the timing of the match requests, the particular game for which a match is requested and game-specific variables associated with the game. By way of example, and not limitation, the matchmaker service 111 may attempt to match users with similar levels of expertise at playing a particular game. Additionally, adults may be matched with other adults and children may be matched with other children. Moreover, the matchmaker service 111 may prioritize user requests based on the order in which those requests are received. The underlying principles of the present disclosure are not limited to any particular set of matching criteria or any particular type of P2P application. More details in regards to the matchmaker service are described in co-pending U.S. patent application No. 61/321,842.

In response to a match request, the matchmaker service 111 can coordinate with the CDX service 110 to ensure that all matched participants receive the necessary connection data for establishing P2P sessions in an efficient and secure manner.

In one embodiment, the invitation service 112 also identifies systems for participation in collaborative P2P sessions. However, in the case of the invitation service 112, at least one of the participants is specifically identified by another participant. For example, the user of system 120 may specifically request a collaborative session with the user of system 121. As with the matchmaker service 111, in response to an invitation request, the invitation service 112 can identify the set of participants and coordinate with the CDX service 110 to ensure that all participants receive the necessary connection data for establishing P2P sessions in an efficient and secure manner.

Figure 2:
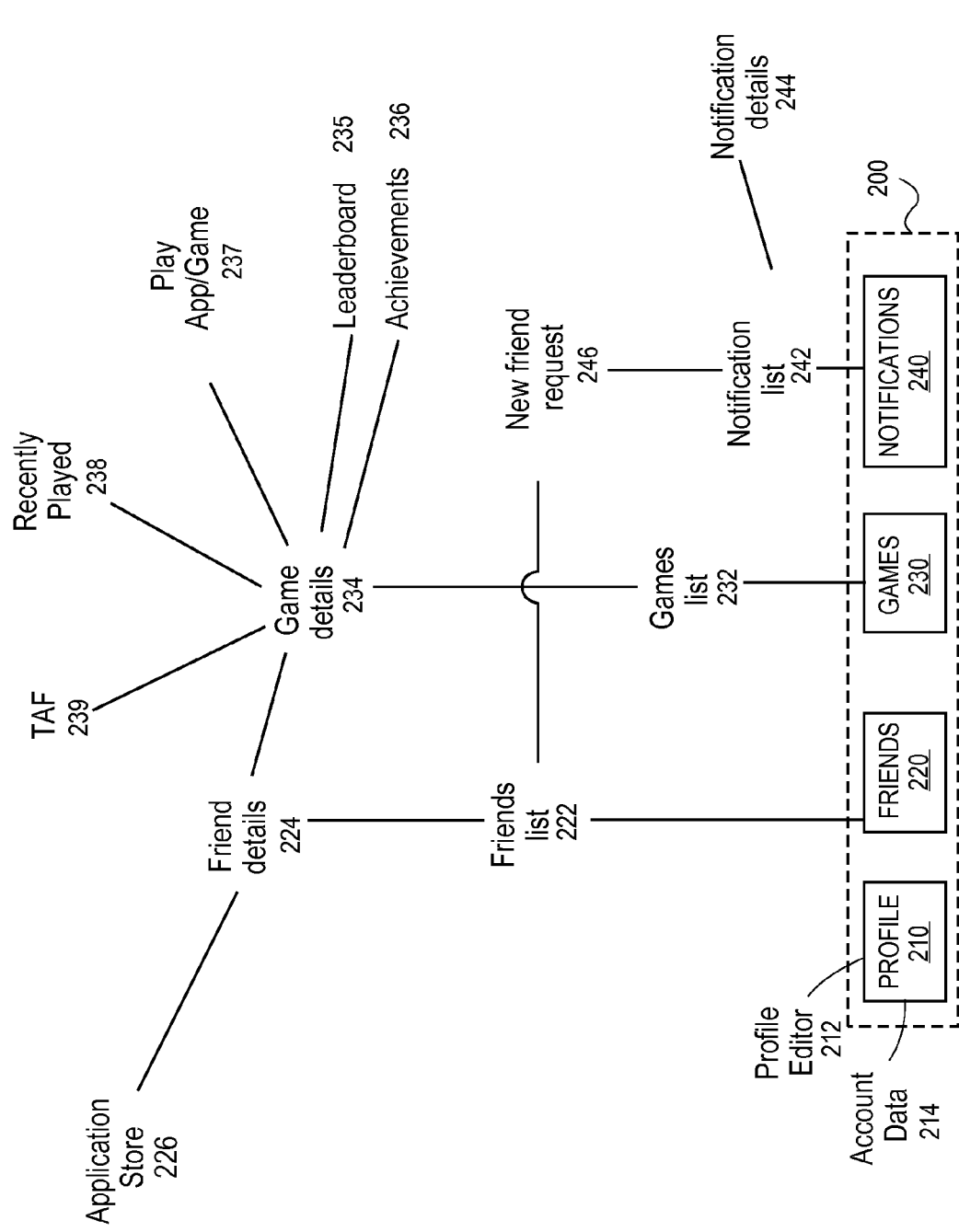
FIG. 2 illustrates an exemplary overview of exemplary gaming options provided by a game center module located on a client system in one embodiment of the present invention.

FIG. 2 illustrates an exemplary overview of gaming options provided by a game center module located on a client system in one embodiment of the present invention. The game center module 200 includes a profile sub-module 210 for providing user profile information (e.g., status information, representation, account data), a friends sub-module 220 for providing information related to a user's friends (e.g., list of friends, editing of friends, games played with friends), a gaming sub-module 230 for providing gaming information for games owned by the user, and a notifications sub-module 240 for providing various types of notifications (e.g., requests, gaming updates, etc.). Each of the sub-modules may provide a user interface with selectable options.

The profile sub-module 210 associated with a profile option provides access to the profile editor option 212 (e.g., avatar editor option) and account data option 214 of the user. An avatar is a representation of a computer user or their alter ego. An avatar is often in the form of a three-dimensional (3D) model used in computer games or a two-dimensional (2D) icon or picture or image or clip art used on Internet forums, social networks and other communities. Avatars can also be used in video games, including online interactive gaming environments. The avatar editor option can create and edit a user's avatar. More details regarding avatars, avatar editing, and features of avatars are described in U.S. provisional patent application No. 61/321,716, entitled "PERSONALIZING COLORS OF USER INTERFACES," filed Apr. 7, 2010, by Marcel van Os, and U.S. provisional patent application No. 61/321,840, entitled "AVATAR EDITING ENVIRONMENT," filed Apr. 7, 2010, by Marcel van Os et al., all of which are incorporated herein by reference in their entirety.

A friends sub-module 220 associated with a friends option provides access to a friends list option 222. These friends can be editing by the user. The list of friends may be friends within one or more networks (e.g., gamecenter network). Certain information (e.g., name, status, representation) regarding each friend is included in the list of friends. A user can obtain additional information regarding a friend by selecting one of the friends. This user selection generates friend details option 224 for the selected friend. These details for the selected friend may include a representation (e.g., avatar), a status, statistics, a list of games played with the friend, a list of other games in common with the friend, a list of games owned by the friend but not owned by the user, etc. A user can select one of the games owned by the friend that the user would like to play. In one embodiment, if the user does not own this game, then the user is automatically directed to an application store option 226 to access the selected game.

A gaming sub-module 230 associated with a gaming option provides access to a games list option 232. Games can be added or deleted from the list of games. Certain information (e.g., game manufacturer, game name, rating) regarding each game may be included in the list of games. A user can obtain additional information regarding a game by selecting one of the games. This user selection generates game details option 234 for the selected game. The games details option 234 can be accessed from option 232 and also from option 224. These game details for the selected game may include a leaderboard option 235, an achievements option 236, a play application/game option 237, a recently played games option 238, and a tell a friend (TAF) option 239.

In one embodiment, these options provided by game details 234 may appear differently depending upon whether a user accessed the game details option 234 from the games list option 232 or from the friend details option 224. For example, if the option 234 is accessed via option 232, then the leaderboard and achievements options relate to the user. If the option 234 is accessed via option 224, then the leaderboard and achievements options relate to a comparison mode with a comparison of user and friend gaming statistics.

A notifications sub-module 240 associated with a notification option provides access to a notification list option 242. These notifications can be edited by the user. The list of notifications may be outgoing requests that are sent or incoming requests that have been received within one or more networks (e.g., gamecenter network). The notification may include gaming updates for a certain game, a notification regarding a new release of a game or a new game being released, etc. Certain information (e.g., name, status, representation) regarding each request is included in the list of notifications s. A user can obtain additional information regarding a notification by selecting one of the notifications. This user selection generates notification details option 244 for the selected notifications. In one embodiment, these details for the selected notifications (e.g., request) may include an invitation to a friend, etc. A user can select an invitation option 246 to invite a new friend. If a new friend is invited at option 246, then option 222 is accessed. Other options and relationships between the options can be provided by the game center module in addition to those illustrated in FIG. 2. FIGS. 3-8 illustrate exemplary flow diagrams for various computer-implemented methods of providing a game center with a game center module and game service.

Figure 3:
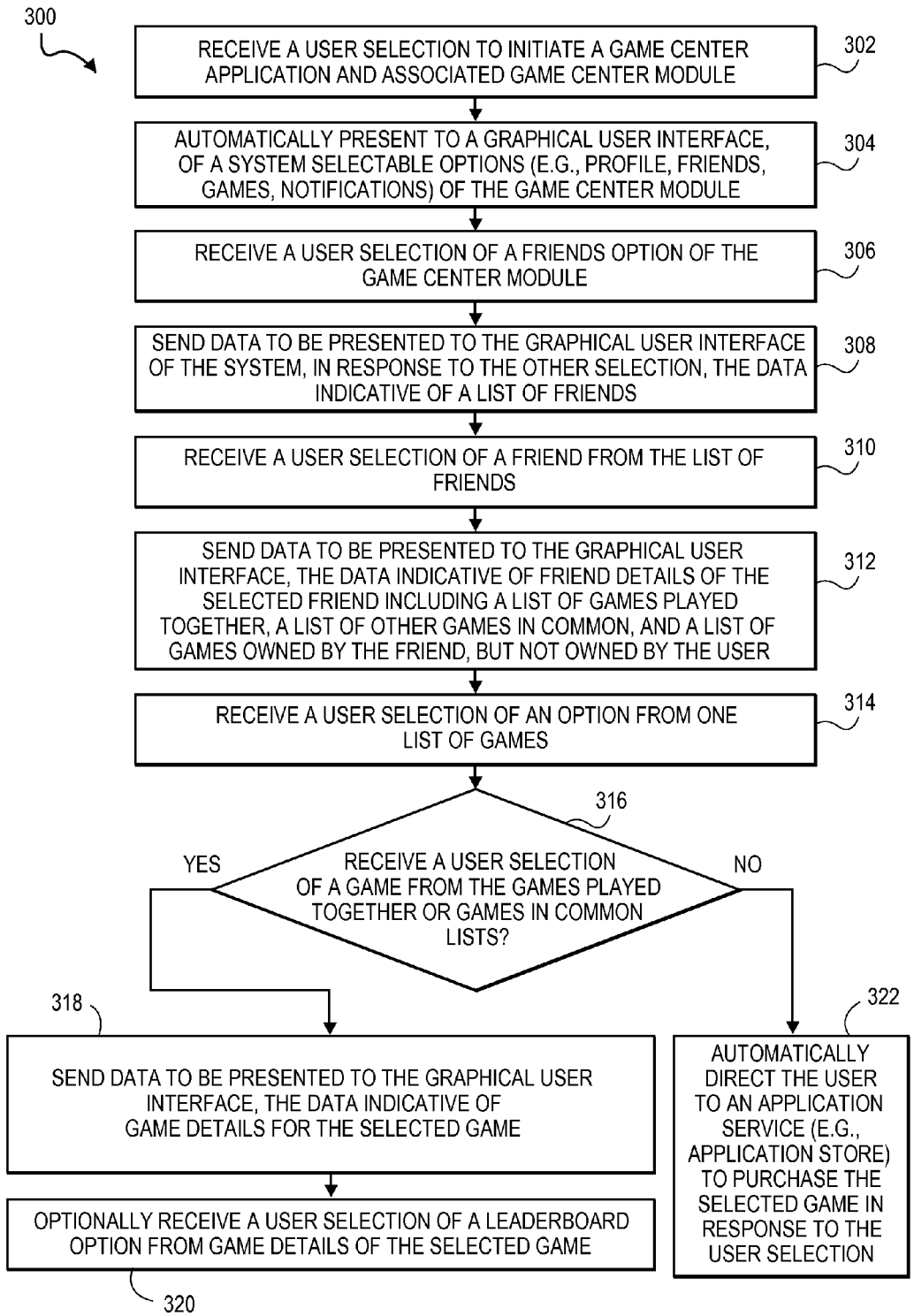
FIG. 3 illustrates a flow diagram in one embodiment of the present invention for a computer-implemented method 300 of providing a game center on a client system with a game center module having customized player specific options and statistics.

FIG. 3 illustrates a flow diagram in one embodiment of the present invention for a computer-implemented method 300 of providing a game center on a client system with a game center module having customized player specific options and statistics. The computer-implemented method 300 is performed by processing logic that may comprise hardware (circuitry, dedicated logic, etc.), software (such as is run on a general purpose computer system or a dedicated machine or a system), or a combination of both. In one embodiment, the computer-implemented method 300 is performed by the game center module 200 located on a client system.

At block 302, the processing logic receives a user selection to initiate the game center application and associated game center module. At block 304, the processing logic can automatically present to the graphical user interface selectable options (e.g., profile, friends, games, notifications) of the game center module. At block 306, the processing logic may receive a user selection of a friends option of the game center module. At block 308, the processing logic can send data to be automatically presented to a graphical user interface of the system in response to the user selection. The data is indicative of a list of friends. At block 310, the processing logic may receive a user selection of a friend from the list of friends. The processing logic can send data to be automatically presented to the graphical user interface. The data is indicative of friend details of the selected friend including a list of games played together, a list of other games in common, and a list of games owned by the friend, but not owned by the user at block 312.

In an embodiment, the list of games played together includes a list of options with each option indicating a respective game name and a set of achievements for the friend while playing the respective game. Each option may also indicate a comparison of a user's ranking and the selected friend's ranking for the respective game. The processing logic may receive a user selection of an option from one of the list of games at block 314. At block 316, the processing logic can determine whether a user selection of a game from the games played together or games in common lists is received. At block 318, the processing logic can send data to be automatically presented to the graphical user interface. The data is indicative of game details for the selected game if a game from the games played together list or games in common list is received. At block 320, the processing logic may then optionally receive a user selection of a leaderboard option from game details of the selected game. The leaderboard may include rankings for top players, the user, and the friend for the selected game. Alternatively, the leaderboard may include rankings for top players and the user.

In another embodiment, the processing logic receives a user selection of a game from the games owned by the friend and not owned by the user list at block 314. In this case, at block 322, the processing logic can automatically direct the user to an application service (e.g., application store) to purchase the selected game in response to the user selection.

Figure 4:
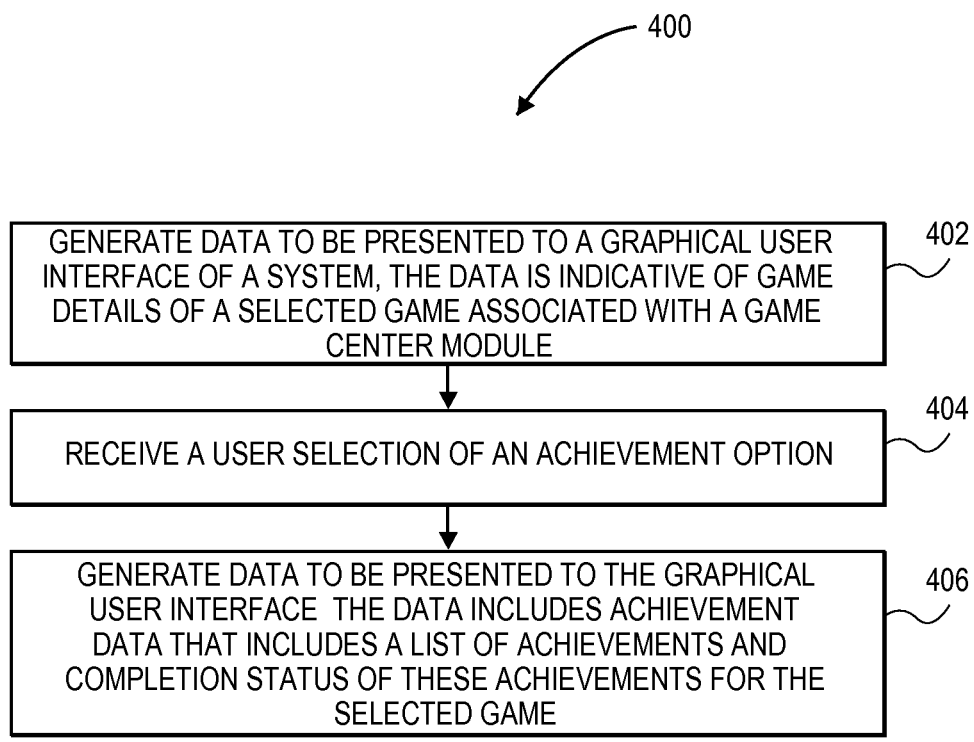
FIG. 4 illustrates a flow diagram in one embodiment of the present invention for a computer-implemented method 400 of providing a game center on a client system with a game center module having customized game achievement options.

FIG. 4 illustrates a flow diagram in one embodiment of the present invention for a computer-implemented method 400 of providing a game center on a client system with a game center module having customized game achievement options. The computer-implemented method 400 is performed by processing logic that may comprise hardware (circuitry, dedicated logic, etc.), software (such as is run on a general purpose computer system or a dedicated machine or a system), or a combination of both. In one embodiment, the computer-implemented method 400 is performed by the game center module 200 located on a client system.

The game center module is initiated and presents selectable options (e.g., profile, friends, games, notifications) as discussed in blocks 302 and 304 of computer-implemented method 300. At block 402, processing logic can generate data to be presented to a graphical user interface of a system. The data is indicative of game details of a selected game associated with a game center module (e.g., software application). The game details are associated with a game details option (e.g., game details option 234), which can be accessed via a friends option or a games option as discussed above and illustrated in FIG. 2. The game details include an achievement option that indicates a set of achievements of a user for the selected game. At block 404, the processing logic receives a user selection of the achievement option. At block 406, the processing logic can generate data to be presented to the graphical user interface. The data includes achievement data that includes a list of achievements and completion status of these achievements for the selected game.

In one embodiment, the game details are accessed via a games option. In this case, the achievement data includes a user's score based on a number of achievements completed. The achievement data also includes a list of achievements with each achievement having an achievement icon if the achievement is completed by the user. Alternatively, progress information is provided that indicates an amount of completion if the achievement has not been completed.

In another embodiment, the game details are accessed via a friends option. In this case, the processing logic receives a user selection of a friend prior to receiving the user selection of the achievement option. The achievement data that is generated in response to the user selection of the achievement option includes a comparison of a user's score based on a number of achievements completed by the user to a friend's score based on a number of achievements completed by the friend. The achievement data also includes an indication for the friend regarding whether the friend has completed each achievement in the list of achievements and another indication for the user regarding whether the user has completed each achievement in the list of achievements.

Figure 5:
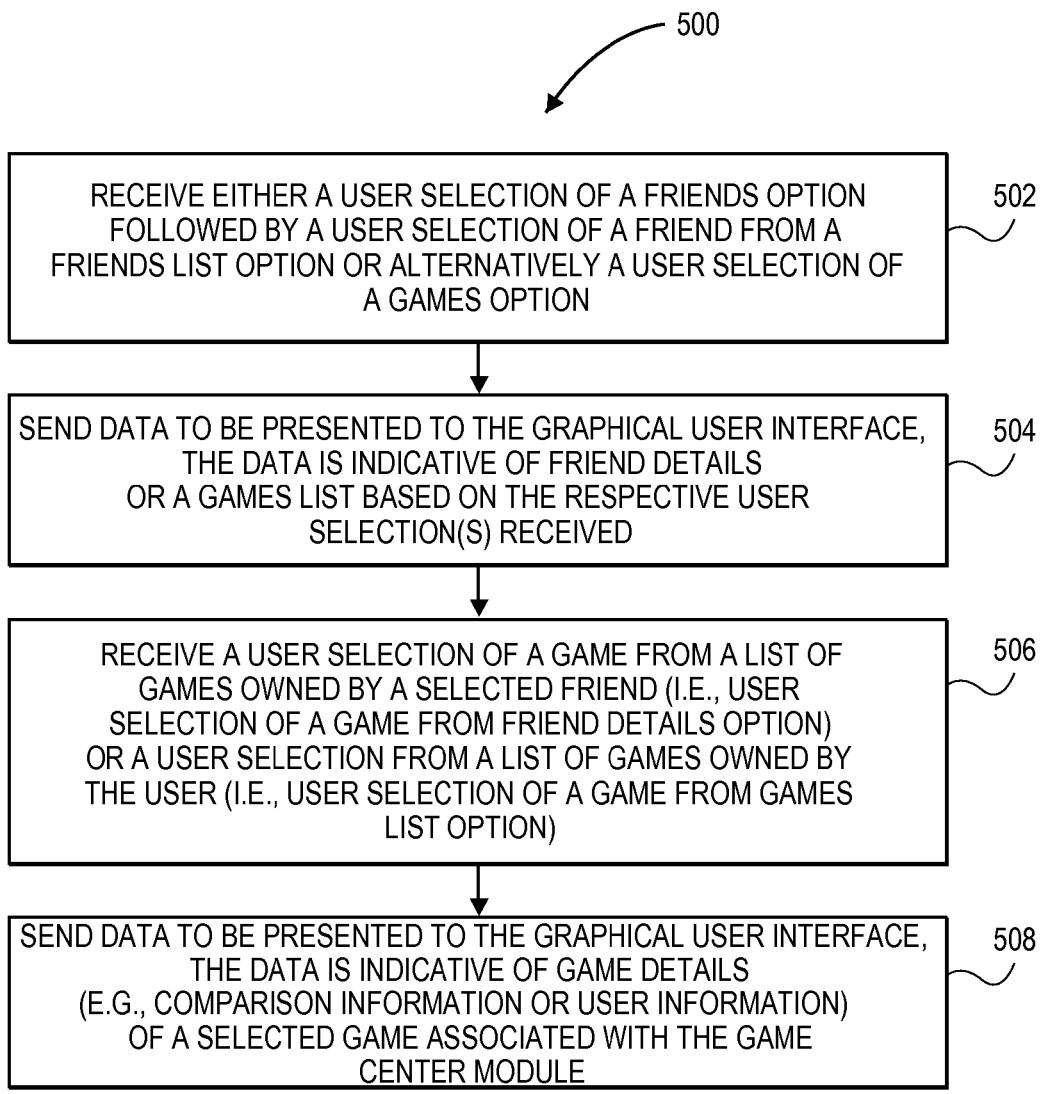
FIG. 5 illustrates a flow diagram in one embodiment of the present invention for a computer-implemented method 500 of providing a game center on a client system with a game center module having customized game details based on being accessed via a friends option or a games option.

FIG. 5 illustrates a flow diagram in one embodiment of the present invention for a computer-implemented method 500 of providing a game center on a client system with a game center module having customized game details based on being accessed via a friends option or a games option. The computer-implemented method 500 is performed by processing logic that may comprise hardware (circuitry, dedicated logic, etc.), software (such as is run on a general purpose computer system or a dedicated machine or a system), or a combination of both. In one embodiment, the computer-implemented method 500 is performed by the game center module 200 located on a client system.

The game center application and associated module are initiated and the module presents selectable options (e.g., profile, friends, games, notifications) as discussed in blocks 302 and 304 of computer-implemented method 300. At block 502, processing logic may receive either a user selection of a friends option causing generation of a friends list option followed by a user selection of a friend from the friends list or alternatively the processing logic may receive a user selection of a games option. At block 504, the processing logic can send data to be presented to the graphical user interface. The data is indicative of friend details or a games list based on the respective user selection(s) received at block 502. For example, friend details are generated in response to a user selection of a friend from the friends list option. Alternatively, a games list is generated in response to a user selection of the game option. At block 506, the processing logic may receive a user selection of a game from a list of games owned by a selected friend (i.e., user selection of a game from friend details option) or a user selection from a list of games owned by the user (i.e., user selection of a game from games list option). At block 508, the processing logic can send data to be presented to the graphical user interface. The data is indicative of game details of a selected game associated with the game center module. The game details include comparison information for a selected friend and the user for the selected game if the user accesses the gaming details from the friend details option (e.g., friend detail option 224). Alternatively, the game details include user information only about the user for the selected game if the user accesses the gaming details from the games list option (e.g., games list option 232).

In one embodiment, the comparison information includes a leaderboard option that indicates a comparison of a user's ranking and the selected friend's ranking for the selected game. The comparison information may further include an achievement option that indicates a comparison of the user's set of achievements and the selected friend's set of achievements for the selected game.

In another embodiment, the user information includes a leaderboard option that indicates a user's ranking for the selected game and an achievement option that indicates a user's set of achievements for the selected game. Thus, the game details option presents a first set of options in a comparison mode if accessed via a friend details option and a second set of options in a non-comparison mode if accessed via a games list option.

Figure 6:
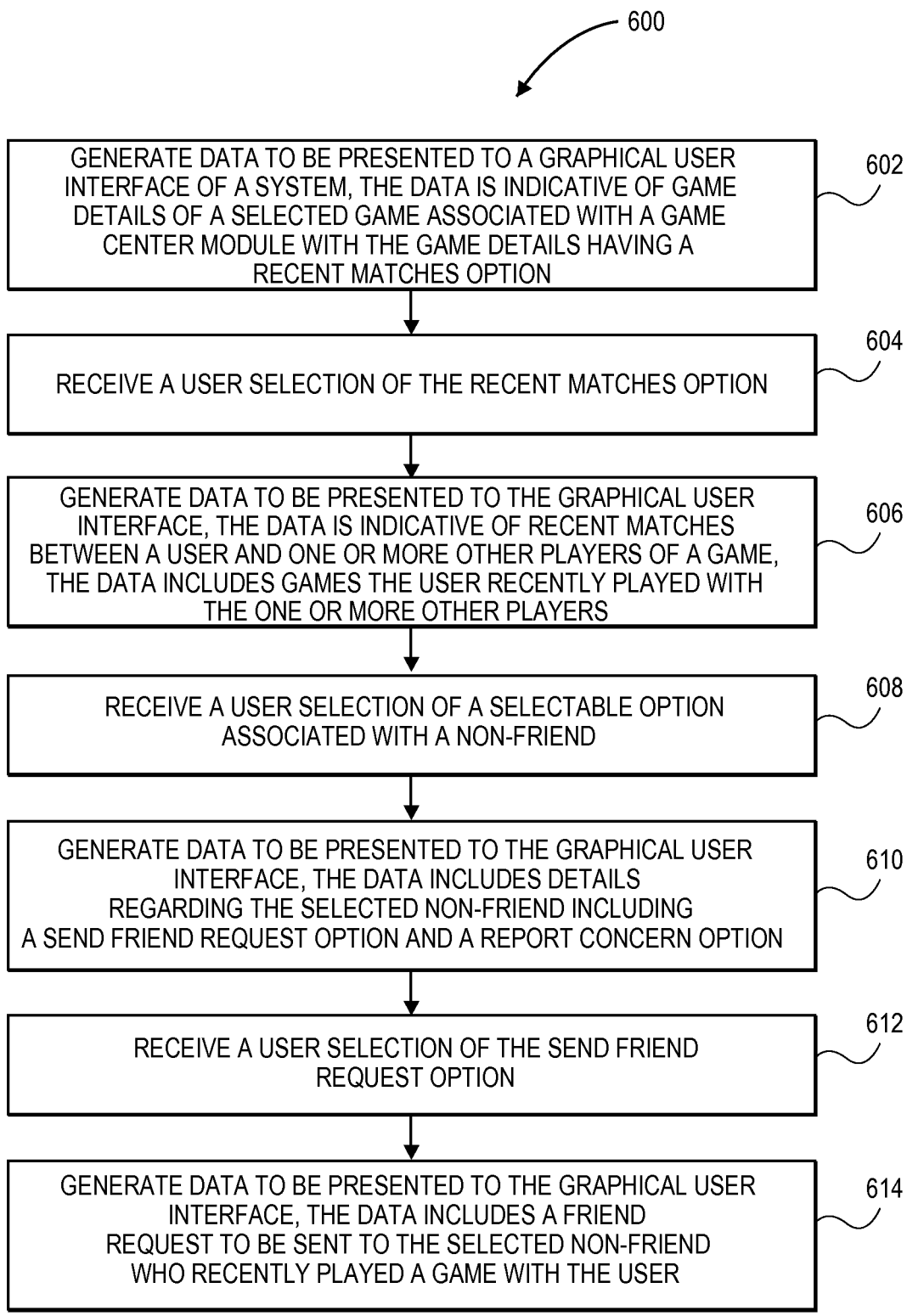
FIG. 6 illustrates a flow diagram in one embodiment of the present invention for a computer-implemented method 600 of matching players who have recently played games together.

FIG. 6 illustrates a flow diagram in one embodiment of the present invention for a computer-implemented method 600 of matching players who have recently played games together with a client system. The computer-implemented method 600 is performed by processing logic that may comprise hardware (circuitry, dedicated logic, etc.), software (such as is run on a general purpose computer system or a dedicated machine or a system), or a combination of both. In one embodiment, the computer-implemented method 600 is performed by the game center module 200 located on a client system.

The game center application and associated game center module are initiated and the module presents selectable options (e.g., profile, friends, games, notifications) as discussed in blocks 302 and 304 of computer-implemented method 300. A user can select a friends option or a games option in order to access a game details option for a specific game as discussed in blocks 502, 504, and 506 of computer-implemented method 500 and also illustrated in FIG. 2. At block 602, the processing logic can generate data to present to a graphical user interface of a system. The data is indicative of game details of a selected game associated with a game center module with the gaming details having a recent matches option. At block 604, the processing logic may receive a user selection of the recent matches option. At block 606, the processing logic can generate data to present to the graphical user interface. The data includes recent matches data that includes recent matches between the user and one or more other players. The data includes games the user recently played with the one or more other players. For example, the data may include a list of players and associated games recently played with the user. The players may include friends or alternatively friends and non-friends.

The list of players may include gaming information for each friend of the user such as name, status message, representation (e.g., avatar), and date of last match with the user. The gaming information for each non-friend of the user may include name, representation (e.g., avatar), and date of last match with the user. Each player in the list of players is associated with a selectable option.

At block 608, the processing logic may receive a user selection of a selectable option associated with a non-friend. At block 610, the processing logic can generate data to present to the graphical user interface details. The data includes details in regards to the selected non-friend including a notification (e.g., send friend request) option and a report concern option. At block 612, the processing logic may receive a user selection of the send friend request option. At block 614, the processing logic can generate data to present to the graphical user interface. The data includes a friend request to be sent to the selected non-friend who recently played a game with the user. Thus, a user can invite a non-friend to become a friend based on a list of players that recently played games with the user. A "friend" may be defined as a user having an account that is associated or linked with an account from another user. More details in regards to the friends service operations and defining a "friend" are described in the co-pending Friend Service Application.

Figure 7:
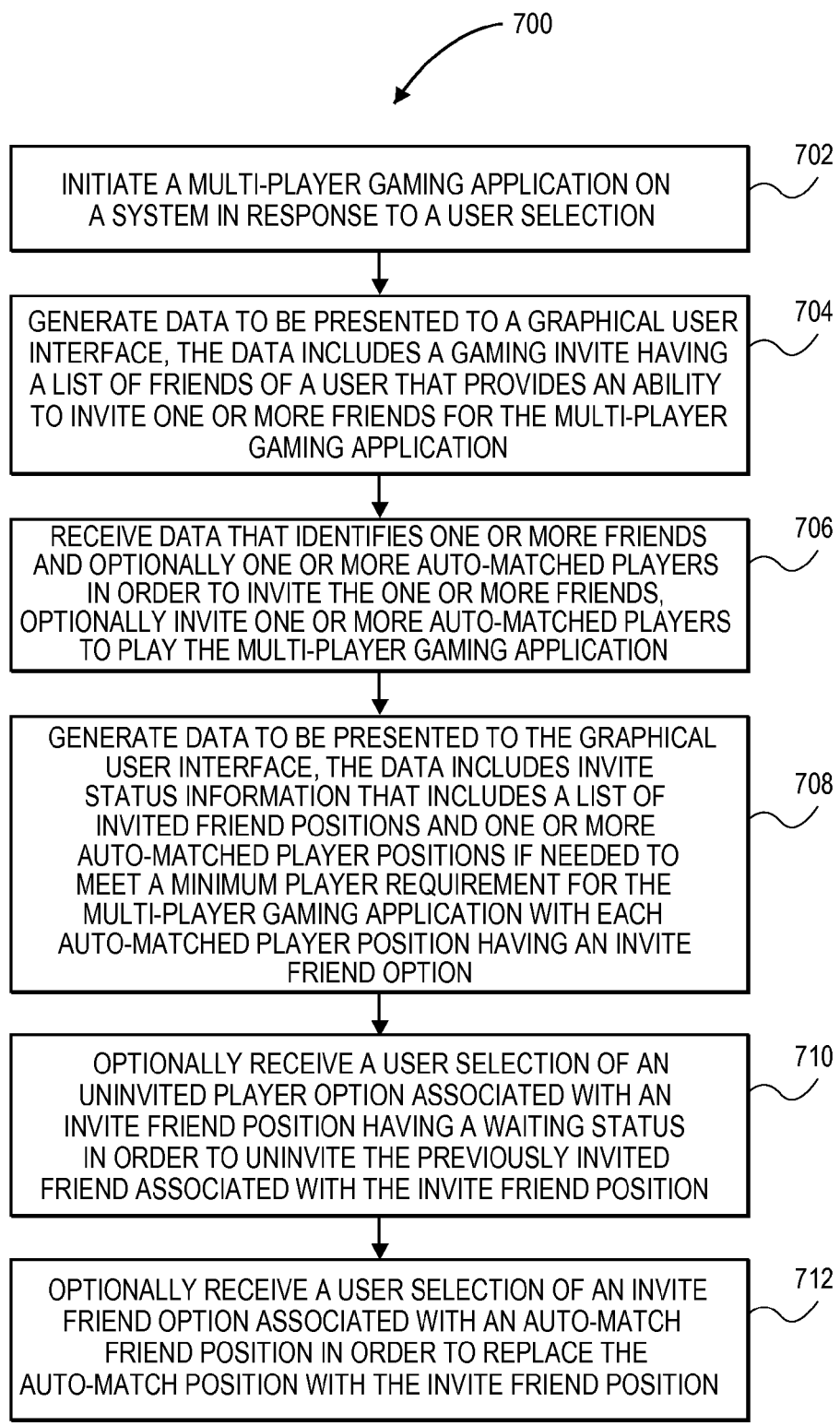
FIG. 7 illustrates a flow diagram in one embodiment of the present invention for a computer-implemented method 700 of providing a multi-player game invite to invite players based on a user's list of friends or auto-matching players with a game service.

FIG. 7 illustrates a flow diagram in one embodiment of the present invention for a computer-implemented method 700 of providing a multi-player game invite to invite players based on a user's list of friends or auto-matching with a game service. The computer-implemented method 700 is performed by processing logic that may comprise hardware (circuitry, dedicated logic, etc.), software (such as is run on a general purpose computer system or a dedicated machine or a system), or a combination of both. In one embodiment, the computer-implemented method 700 is performed by the game center module 200 located on a client system.

At block 702, processing logic in response to a user selection initiates a multi-player gaming application on a system. At block 704, the processing logic can generate data to present to a graphical user interface of the system. The data includes a gaming invite having a list of friends of a user that provides an ability to invite one or more friends for the multi-player gaming application. The friends can be invited individually or simultaneously. At block 706, the processing logic may receive data that identifies one or more of a user's friends to invite to play the multi-player gaming application (e.g., receive a user selection of at least one friend from the list of friends in order to invite the at least one friend to play the multi-player gaming application). At block 708, the processing logic can generate data to present to the graphical user interface. The data includes invite status information for the one or more invited friends and the one or more auto-matched players. The invite status information may includes a list of invited friend positions and one or more auto-matched player positions if needed to meet a minimum player requirement for the multi-player gaming application with each auto-matched player position having an invite friend option. A multi-player gaming application typically has a minimum and a maximum number of player slots or positions. Any empty positions that need to be filled and are not filled by friends of the user can be automatically filled by the auto-matching function of the game center module. In one embodiment, in response to the user's selection of a friend at block 706, a series of invitation transactions may be implemented with the invitation service 112 such as those described in the Co-Pending applications. Additionally, in one embodiment, in order to fill additional player slots or positions, a series of matchmaking transactions may be implemented with a matchmaking service 111 such as those described in the Co-Pending applications.

In one embodiment, each invite friend position has status information including waiting or ready. Each invite friend position having a waiting status may also have an uninvite player option. At block 710, the processing logic optionally receives a user selection of the uninvite player option associated with an invite friend position having a waiting status in order to uninvite the previously invited friend associated with the invite friend position. The user selection of the uninvite player option and subsequent confirmation allows the user to replace the previously invited friend with a player selected automatically by the matchmaker service or a player selected by the user. The invite friend position has a waiting status, which indicates that an invited friend has not accepted an invite. An invite friend position having a ready status, which indicates that the friend has accepted the invitation, may not be replaced with an auto-match player. Alternatively, the invite friend position may have an auto-match option. A user selection of this option causes the invite friend position having a waiting status to be replaced with an auto-match player position.

At block 712, the processing logic optionally receives a user selection of an invite friend option associated with an auto-match friend position in order to replace the auto-match position with the invite friend position. Thus, a user can enjoy a multi-player gaming experience with friends and auto-matched players.

Figure 8:
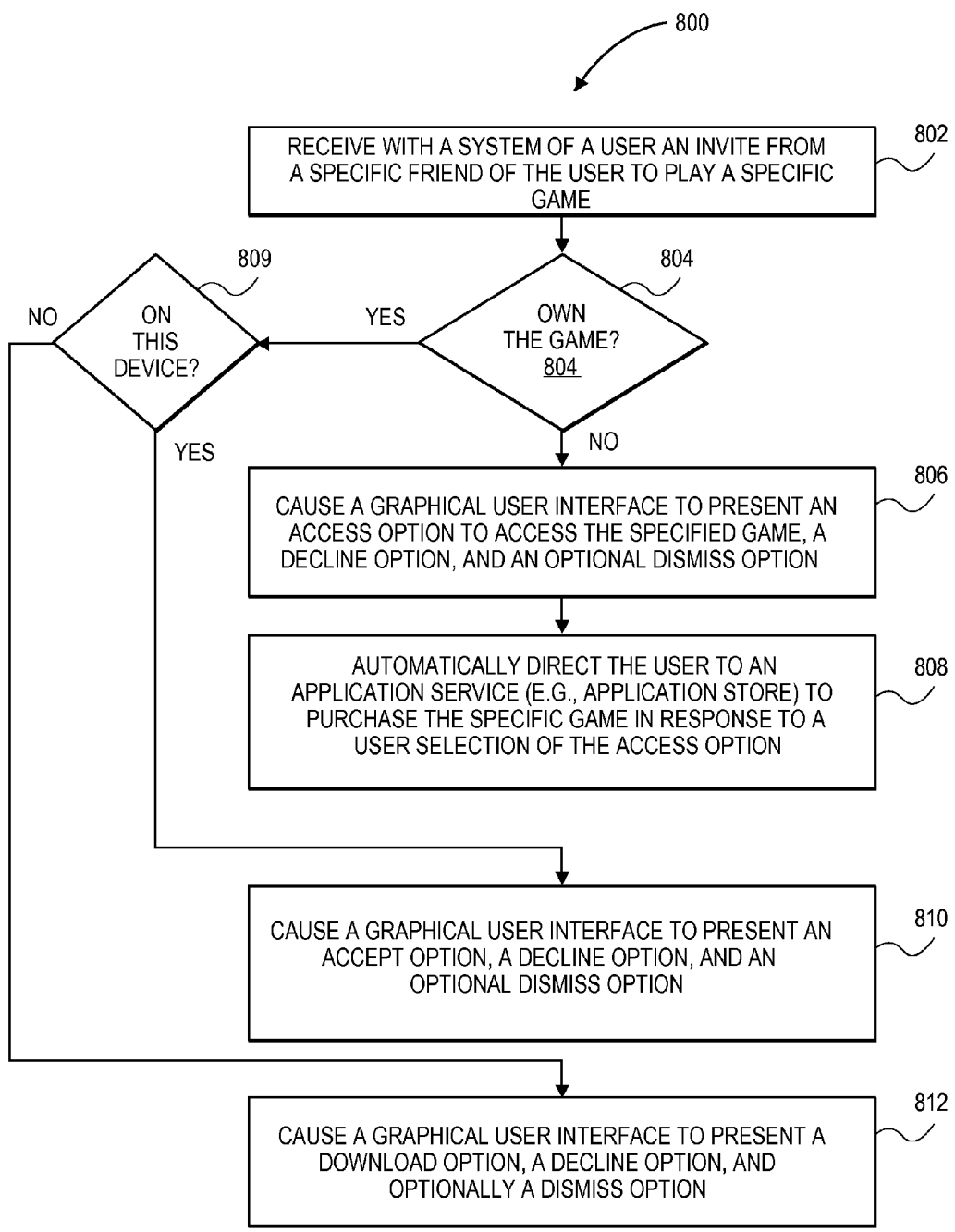
FIG. 8 illustrates a flow diagram in one embodiment of the present invention for a computer-implemented method 800 of receiving a gaming invite with a client system.

FIG. 8 illustrates a flow diagram in one embodiment of the present invention for a computer-implemented method 800 of receiving a gaming invite with a client system. The computer-implemented method 800 is performed by processing logic that may comprise hardware (circuitry, dedicated logic, etc.), software (such as is run on a general purpose computer system or a dedicated machine or a system), or a combination of both. In one embodiment, the computer-implemented method 800 is performed by the game center module 200 located on a client system.

At block 802, the processing logic receives with a system of a user an invite from a specific friend of the user to play a specific game. At block 804, the processing logic determines whether the user owns the specific game. At block 806, the processing logic presents to a graphical user interface various options including an access option to access the specific game if the user does not own the specific game, a decline option to decline the game invite, and an optional dismiss option to dismiss the game invite. Selection of the dismiss option allows the user to decide at a later time whether to decline or access the game.

At block 808, the processing logic automatically directs the user to an application service (e.g., application store) to purchase the specific game in response to a user selection of the access option (e.g., purchase, application store). Alternatively, the processing logic may automatically direct, in response to the user selection of the access option, the user to the application service to access for free a fully functional version of the game for a limited time period or a limited functionality demo copy.

At block 810, the processing logic presents to a graphical user interface an accept option to accept the invite and play the specific game with the sender of the invite if the user owns the specific game on the device. The processing logic also presents to the graphic user interface a decline option to decline the invite and optionally a dismiss option to dismiss the invite for a period of time.

At block 812, the processing logic presents to a graphical user interface a download option to accept the invite and download the specific game with the sender of the invite if the user owns the specific game, but not on the device being used currently by the user. The processing logic also presents to the graphic user interface a decline option to decline the invite and optionally a dismiss option to dismiss the invite for a period of time.

For example, in one embodiment, one player generates and sends an invite to another player. The data service 100 may locate the player to receive the invite and the invitation service 112 sends the invite to this player who can then easily and quickly obtain the game or play the game as discussed above.

Figure 9C:
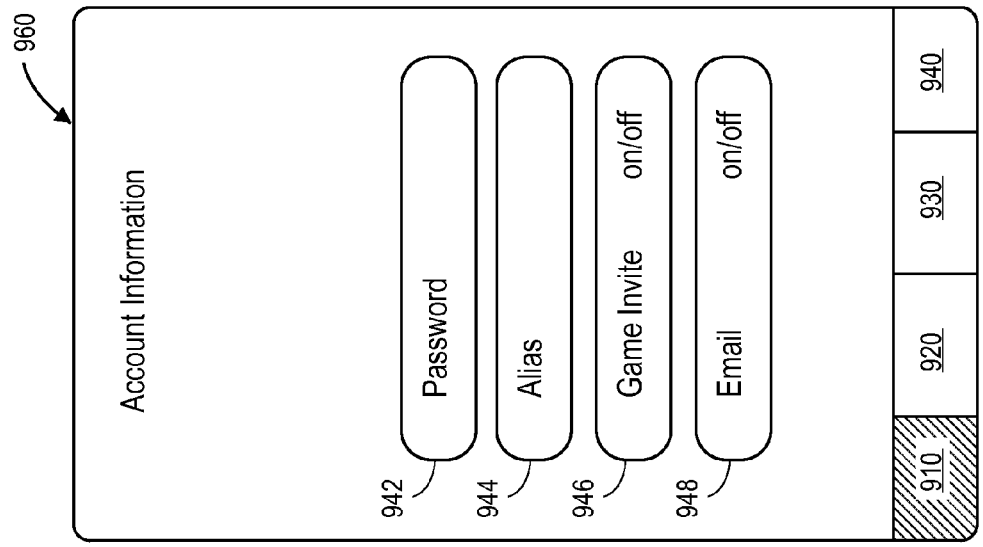
FIG. 9C illustrates an exemplary user interface 960 having account information options in one embodiment of the present invention.

FIGS. 9A-9D, 10-29, 34-42 and 45 illustrate exemplary user interfaces (e.g., graphical user interfaces (GUI)) provided by a game center module located on a client system in accordance with at least certain embodiments of the present disclosure. FIG. 9A illustrates an exemplary user interface 900 that is generated upon initiation of the game center module in one embodiment of the present invention. In one embodiment, option 910 is associated with a user profile, option 920 is associated with friends, option 930 is associated with gaming applications (e.g., games), and option 940 is associated with notifications.

Figure 9B:
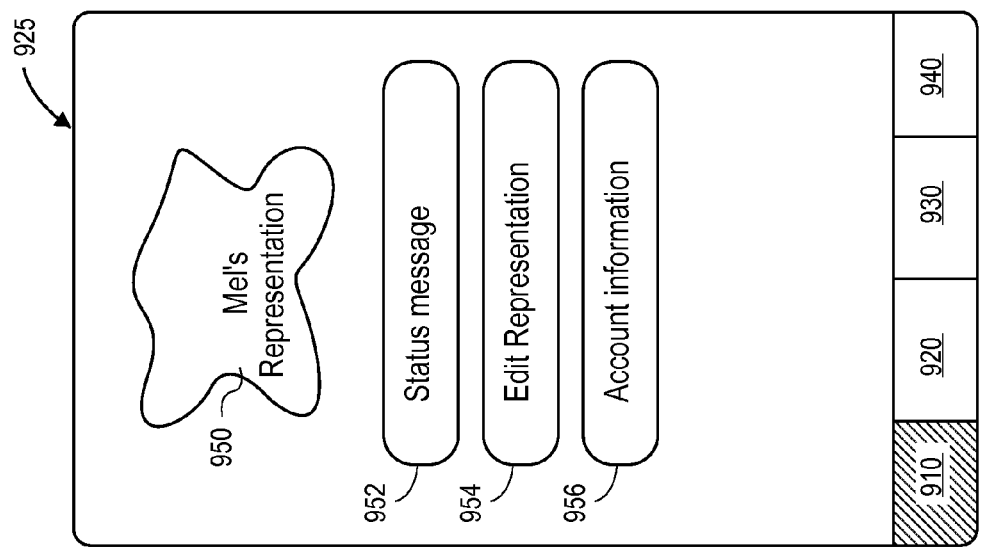
FIG. 9B illustrates an exemplary user interface 925 that is generated upon selection of a profile option 910 in one embodiment of the present invention.

FIG. 9B illustrates an exemplary user interface 925 that is generated upon selection of a profile option 910 in one embodiment of the present invention. For example, a user may select option 910 from an initial game center user interface 900 and the processing logic automatically generates and presents a user interface 925 illustrated in FIG. 9B having different profile options. These profile options may include generating/editing option 954 to generate a representation 950 (e.g., 2D avatar, 3D avatar) for the user (e.g., Mel), status message 952, and an account information option 956. The account information may relate to an account for account services 113.

FIG. 9C illustrates an exemplary user interface 960 having account information options in one embodiment of the present invention. The processing logic generates user interface 960 in response to a user selection of option 956. In one embodiment, option 956 displays a user's email address. This interface 960 includes password option 940, alias option 942, game invite option 944, and email option 946.

Figure 9D:
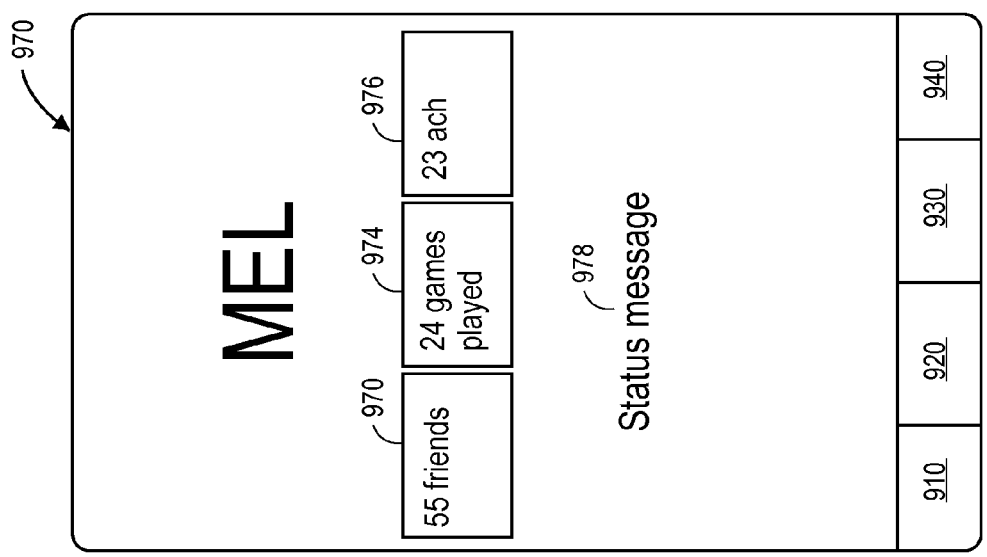
FIG. 9D illustrates an exemplary user interface 970 that is generated upon selection of a profile option 910 in one embodiment of the present invention.

FIG. 9D illustrates an exemplary user interface 970 that is generated upon selection of a profile option 910 in one embodiment of the present invention. For example, a user may select option 910 from an initial game center user interface 900 and the processing logic automatically generates and presents a user interface 970 illustrated in FIG. 9D. The user interface 970 includes the user's name or user name (e.g., MEL), a number of gaming friends (e.g., 55), a number of games played by the user (e.g., 73), and a number of completed achievements (e.g., 15). The user interface 970 also includes a status message 978 that is set by the user.

FIG. 10 illustrates an exemplary user interface 1000 having a list of friends 1050 in one embodiment of the present invention. The user interface 1000 is generated in response to a user selection of the friends option (e.g., option 820). The list of friends 1050 can be searched with a search option 1060 using various search categories (e.g., name, nickname). One or more databases having friend information (e.g., email, name, nickname) can be searched to find a friend by name or nickname. Information for each friend (e.g., user name 1, user name 2, user name 3) in the list of friends is displayed on the user interface 1000. This friend information includes user name, a status message provided by the friend (e.g., I just dominated this game), an optional representation (REPR) for the friend, and the game most recently played by the friend, etc. The representation may be an avatar for the friend. A user selection of option 1070 provides a list of the user's contacts and associated contact information (e.g., phone #, email address, URL, address, additional fields, etc.).

Figure 11B:
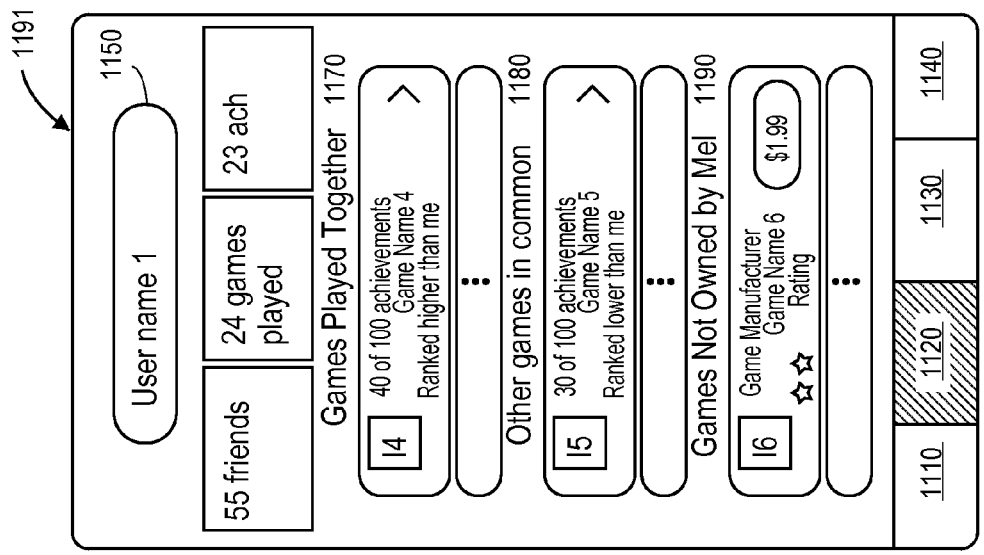
FIG. 11B illustrates an exemplary user interface 1191 having friend details of a particular friend in one embodiment of the present invention.

FIGS. 11A and 11B illustrate exemplary user interfaces 1100 and 1191 having friend details of a particular friend in one embodiment of the present invention. The user interfaces 1100 and 1191 can be generated in response to a user selection of a friend from the list of friends 1050. These user interfaces include friend details for the selected friend including a user name (e.g., nickname or name) option 1150, number of friends, number of games played, number of achievements, an optional representation (e.g., avatar) 1160, a list 1170 of games played together between the friend and the user, a list 1180 of other games in common between the friend and the user, and a list 1190 of games owned by the friend, but not owned by the user (e.g., Mel). For each game played together, the list 1170 may include a game icon (e.g., 14), achievements of the friend for the particular game, the name of the game, and a comparison of how the friend and the user rank on the leaderboard (e.g., ranked higher than me, ranked waaaaaaaay higher than me, ranked about the same as me) for a particular game. For example, the friend is ranked higher than the user for game name 4 displayed in the list 1170.

In certain embodiments, the user and friends rankings are compared to each other and displayed. For example, for game name 4 the friend may be ranked in the $47^{th}$ percentile and the user is ranked in the $49^{th}$ percentile. In this case, the friend and the user are ranked about the same. In another embodiment, the friend is ranked first and the user is ranked last for the game name 4. In this case, the friend is ranked waaaaaaaay higher than me.

The game icon may be retrieved from the client system or a server if the client system does not have the game icon. In an embodiment, a friend selects a color for the friend's representation (e.g., avatar). Processing logic generates this color on the user's system and also automatically selects a complementary color or background based on the friend's color. The background color may be used for at least some of the text on this user interface 1100.

The user selections (e.g., color, background pattern) for the user's representation (e.g., avatar) or other settings may be broadcast such that new game developers can use these selections as part of the game. For example, a user having a color preference of blue may be able to play a new game with the user automatically or by default having a blue game component (e.g., avatar, car) while playing the game.

For each game in common, the list 1180 may include a game icon (e.g., 15), achievements of the friend for the particular game, the name of the game, and a comparison of how the friend and the user rank on the leaderboard (e.g., "ranked higher than me") for a particular game. For example, the friend is ranked lower than the user for game name 5 displayed in the list 1180.

For each game owned by the friend and not owned by the user (e.g., Mel), the list 1190 may include a game icon (e.g., 16), the game manufacturer of the particular game, the name of the game, a rating for a particular game (e.g., 2 out of 5 stars), and a cost of purchasing the particular game. For example, game name 6 has a two star rating and costs $1.99 to purchase from an online application store. The processing logic automatically directs the user to an online application store (e.g., application service 114) to purchase the selected game in response to the user selection of one of these games (e.g., game name 6).

The game center module may provide a user interface to buy a fully functionally version of the game. Alternatively, the game center module may provide a user interface to access for free a fully functional version of the game for a limited time period or a limited functionality demo copy. In another embodiment, the game center module provides an application seed that uniquely identifies the gaming application on a server (e.g., application store).

In another embodiment, a user receives an invite from a specific friend to play a specific game that the user does not have. As discussed above, the game center module provides a user interface to buy a fully functional version of the game. Alternatively, the game center module provides a user interface to access for free a fully functional version of the game for a limited time period or a limited functionality demo copy. In yet another embodiment, the game center module provides an application seed that uniquely identifies the gaming application on a server (e.g., application store). In an embodiment, these different options are based on a gaming application's preferences for providing limited rights or full rights.

Figure 12:
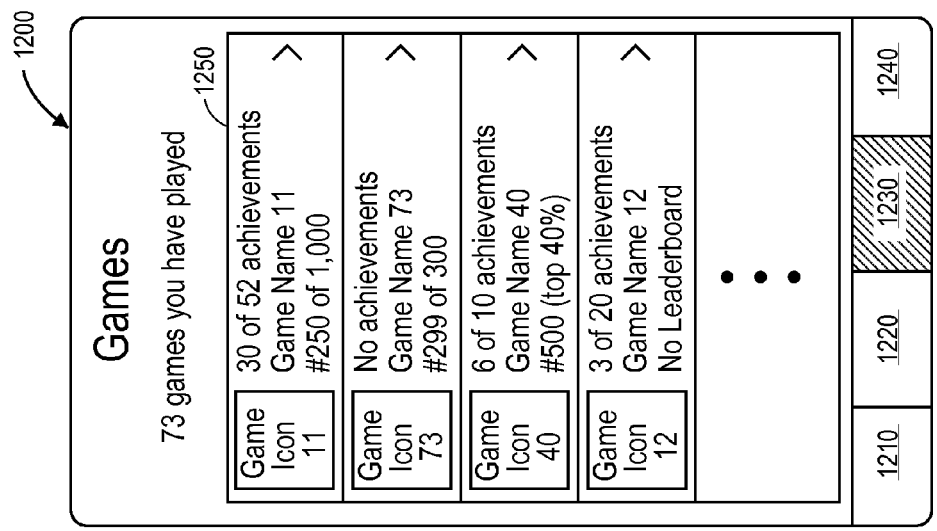
FIG. 12 illustrates an exemplary user interface 1200 having a list of games 1250 in one embodiment of the present invention.

FIG. 12 illustrates an exemplary user interface 1200 having a list of games 1250 in one embodiment of the present invention. The user interface 1200 is generated in response to a user selection of the games option (e.g., option 1230). The list of games 1250 can be ordered alphabetically or in order of most recently played. In an embodiment, the list of games 1250 still includes a particular game even if the user deletes the particular game from the system.

Information for each game in the list of games is displayed on the user interface 1200. This game information includes game icon, user achievements for this game, game name, and ranking for the user playing this game. For example, game name 11 is displayed with game icon 11. The user has 30 of 52 achievements and ranks $250^{th}$ out of 1,000 players. Alternatively, the ranking for the user can be a ranking among the user's friends rather than a ranking among everyone.

Figure 13:
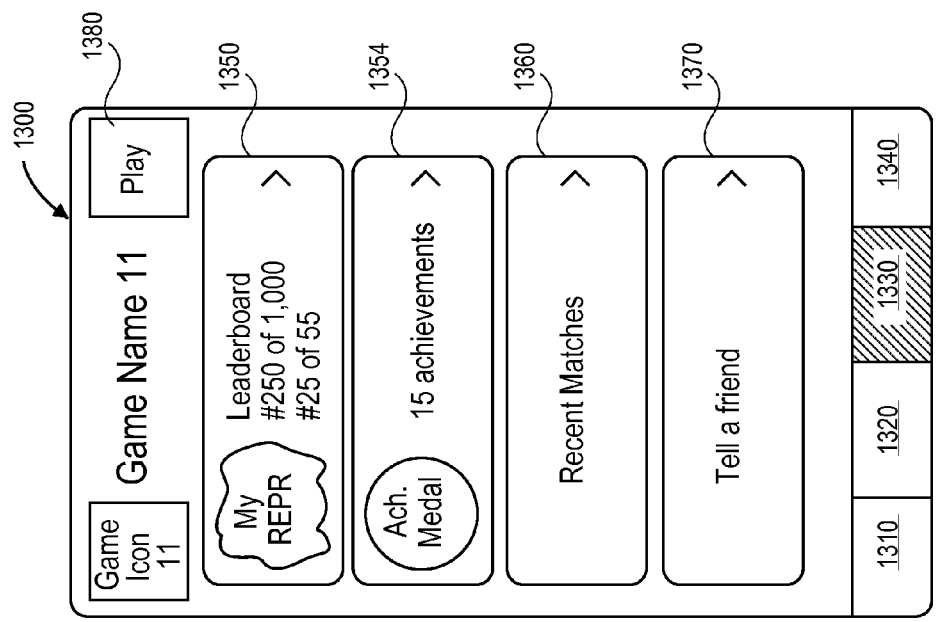
FIG. 13 illustrates an exemplary user interface 1300 having gaming details of a particular game in one embodiment of the present invention.

FIG. 13 illustrates an exemplary user interface 1300 having gaming details of a particular game in one embodiment of the present invention. The user interface 1300 is generated in response to a user selection of a game (e.g., game name 11) from the list of games 1250. This user interface includes details for the selected game including a game icon, a leaderboard option 1350, an achievement option 1354, a recent matches (e.g., recently played) option 1360, and a tell a friend option 1370. The leaderboard option 1350 includes a number of achievements, a representation (e.g., avatar) of the user, and a ranking for the user. The user interface 1300 also includes a play option 1380. A selection of the option 1380 causes the game (e.g., game name 11) to be played. Alternatively, if the user does not have this particular game (e.g., game name 11), then the play option 1380 is replaced with a buy option that links the user to an application store or the play option 1380 could be replaced with a get it option that downloads the game from the application store or another location.

A selection of the option 1350 causes the processing logic to generate user interface 1400 as illustrated in FIG. 14A in one embodiment of the present invention. User interface 1400 is a leaderboard that includes the previously selected game name (e.g., game name 11), a number of games played by the user, a number of players in the leaderboard, and at least a partial list of the leaderboard. The user interface 1400 includes a today option 1450, a this week option 1452, an all time option 1454, a friends options 1460, and an everyone option 1470. The list of leaders can be filtered and ranked based on these options.

In certain embodiments, a certain number of top players are listed (e.g., five) and if the user (e.g., Mel) is not in this list, then the user's ranking is also listed (e.g., $25^{th}$). A show more option 1480 can be selected to display additional player rankings. Optionally, a games recently played option 1490 can filter the rankings to show rankings of the players that played in the most recent games (e.g., 10 most recent games).

Alternatively, a selection of the option 1350 causes the processing logic to generate user interface 1491 as illustrated in FIG. 14B in accordance with one embodiment. User interface 1491 includes a selectable leaderboard option 1492 to select among different leaderboards (e.g., leaderboard 1, leaderboard 2, etc.). For example, Game Name 11 may include 4 different tracks that are not related to each. A different leaderboard can be generated for each track. A merged leaderboard may include rankings aggregated from all tracks. The user interface 1491 includes a today option 1450, a this week option 1452, and an all time option 1454. The list of leaders can be filtered and ranked based on these options.

Friends 1494 includes a ranked list of Mel's friends for Game Name 11. Everyone 1496 includes a ranked list of all users for Game Name 11.

In certain embodiments, a certain number of top players are listed (e.g., five) and if the user (e.g., Mel) is not in this list, then the user's ranking is also listed (e.g., 25th). A show more option (e.g., 1495, 1497) can be selected to display additional player rankings. Optionally, a games recently played option 1490 can filter the rankings to show rankings of the players that played in the most recent games (e.g., 10 most recent games). Different types of metrics can be defined for creating the rankings in the leaderboard. For example, the metrics may include points, number of top finishes, number of finishes within a certain threshold, etc. A game developer can define these metrics and the leaderboard. The user interfaces (e.g., 1400, 1491) may be presented as a smaller snapshot during a game for convenience of the users. The leaderboard presented during a game may have selectable or non-selectable options during the game.

Figures 17, 18A:
FIG. 17 illustrates an exemplary user interface 1700 having achievements in one embodiment of the present invention.
FIG. 18A illustrates an exemplary user interface 1800 having achievements in one embodiment of the present invention.

Returning to FIG. 13, a selection of the option 1354 causes the processing logic to generate user interface 1700 as illustrated in FIG. 17 in one embodiment of the present invention. User interface 1700 includes achievements for the user with respect to the selected game (e.g., game name 11). The achievements include a score based on a number of achievements completed by the user (e.g., 30/52 and a resulting score of 180 points). The user interface 1750 includes a list of achievements 1750. Each achievement has a name, descriptive lines, and an icon if the user has completed the achievement. Otherwise, the icon is replaced with progress information that indicates a current amount of progress toward completing the achievement (e.g., 70%, 30%). The icon may include a question mark (?) if the user has not made any progress towards completing the achievement or less than a certain threshold of progress.

Returning to FIG. 13, a selection of option 1360 causes the processing logic to generate user interface 1900 as illustrated in FIG. 19 in one embodiment of the present invention. The user interface 1900 includes a list of players 1950 from recent matches with the user. For example, all players from the 10 most recent matches with the user can be displayed. The list 1950 may include only friends or all players based on the selection of friend option 1960 or all player option 1962. More information can be shared for friends compared to non-friends. For example, the shared gaming information for each friend of the user may include a name, a status message, a representation (e.g., avatar), and session data (e.g., date of last match with the user). The shared gaming information for each non-friend of the user may include a name, a representation (e.g., avatar), and session data. In an embodiment, session data is obtained from a server. In another embodiment, session data is not shared for friends or non-friends. Each player in the list of players is associated with a selectable option.

A selection of a player that is already a friend causes the processing logic to generate user interface 1100 for the selected friend. A selection of a player that is not a friend causes the processing logic to generate user interface 2000 as illustrated in FIG. 20 in one embodiment of the present invention in order to invite this player to become a friend. User interface 2000 may include a name, a representation (e.g., avatar), and session data for the selected non-friend. Send friend request option 2050 can be selected to generate an exemplary user interface having a friend request communication as illustrated in FIG. 23 or this request can be added to an exemplary user interface having a list of requests as illustrated in FIG. 21 and discussed in more detail below. Alternatively, a concern can be reported regarding this selected player by selecting option 2060 from user interface 2000. Optionally, user interface 2000 may also include a player rating option 2070. The user can provide a rating for the player that was recently matched with the user. Selection of option 2080 causes the generation of the previous user interface 1900.

Returning to FIG. 13, a selection of option 1370 from user interface 1300 causes the processing logic to generate a user interface for creating a communication (e.g., an email message). The user can send the communication to a friend.

FIG. 15A illustrates an exemplary user interface 1500 having game details for a specific game in one embodiment of the present invention. The user interface 1500 is generated in response to a user selection of a game (e.g., game name 11) from user interface 1100 that includes friend details for a particular friend of the user. The user interface 1500 includes details for the selected game including a game icon, a leaderboard option 1550, an achievements option 1560, and a tell a friend option 1570. The leaderboard option 1550 includes a comparison of rankings between the previously selected friend (e.g., Susie) and the user. The user interface 1500 also includes a play option 1580 for playing the selected game.

FIG. 15B illustrates an exemplary user interface 1582 having game details for a specific game in one embodiment of the present invention. The user interface 1582 is generated in response to a user selection of a game (e.g., game name 11) from user interface 1100 that includes friend details for a particular friend of the user. The user interface 1582 includes details for the selected game including a game name, a comparison of points for the user (e.g., Mel) and the friend (e.g., Susie), a leaderboard option 1586, an achievements option 1588. The leaderboard option 1586 includes a comparison of rankings (e.g., 4/55, 25/55) between the previously selected friend (e.g., Susie) and the user for the user's friends. Rankings (e.g., top 15%, top 25%) for Susie and the user among everyone may also be included. An achievements option 1588 includes a comparison of achievements between Susie and the user (e.g., 32/52, 30/52). The user interface 1582 also includes a play option 1584 for playing the selected game.

A selection of the option 1550 from FIG. 15A causes the processing logic to generate user interface 1600 as illustrated in FIG. 16A in one embodiment of the present invention. User interface 1600 is a leaderboard that includes the previously selected game name (e.g., game name 11), a number of games played by the user, a number of players in the leaderboard, and at least a partial list of the leaderboard. The user interface 1600 includes a today option 1650, a this week option 1652, an all time option 1654, a friends options 1660, and an everyone option 1670. The list of leaders can be filtered and ranked based on these options.

In certain embodiments, a certain number of top players are listed (e.g., five) and if the user is not in this list, then the user's ranking is also listed (e.g., $25^{th}$). The selected friend (e.g., Susie) may also be included in the rankings to show a comparison between Susie and the user (e.g., Mel). A show more option 1680 can be selected to display additional player rankings. Optionally, a games recently played option 1690 can filter the rankings to show rankings of the players that played in the most recent games (e.g., 10 most recent games).

Returning to FIG. 15B, a selection of the option 1586 causes the processing logic to generate user interface 1691 as illustrated in FIG. 16B in one embodiment of the present invention. User interface 1691 includes a selectable leaderboard option 1692 to select among different leaderboards (e.g., leaderboard 1, leaderboard 2, etc.). Alternatively, a merged leaderboard may include rankings from all leaderboards. The user interface 1691 includes a today option 1650, a this week option 1652, and an all time option 1654. The list of leaders can be filtered and ranked based on these options.

Friends 1694 includes a ranked list of Mel's friends for Game Name 11. Everyone 1696 includes a ranked list of all users for Game Name 11.

In certain embodiments, a certain number of top players are listed (e.g., five) and if the user (e.g., Mel) is not in this list, then the user's ranking is also listed (e.g., 250th). Susie's ranking may also be listed even if she is not in the certain number of top players. A show more option (e.g., 1695, 1697) can be selected to display additional player rankings. As discussed above, the user interfaces (e.g., 1600, 1691) may be presented as a smaller snapshot during a game for convenience of the users.

Returning to FIG. 15A, a selection of the option 1560 causes the processing logic to generate user interface 1800 as illustrated in FIG. 18A in one embodiment of the present invention. User interface 1800 includes a comparison of scores for the user and the selected friend with the scores being based on a number of achievements completed. For examples, Susie has 210 points and Mel has 180 points for game name 11. User interface 1800 also includes a list of achievements for the previously selected game name (e.g., game name 11) and displays these achievements for the previously selected friend (e.g., Susie) and the user. For example, Susie has completed achievements 1 and 3 as illustrated in FIG. 18, but Susie has not completed achievements 2 and 4. The user has completed achievements 1 and 2 as illustrated by the icons 1 and 2, but has not completed achievements 3 and 4. Each achievement has a name, descriptive lines, and an icon if the user has completed the achievement. Otherwise, the icon is replaced with progress information that indicates in numerical and graphical form a current amount of progress toward completing the achievement (e.g., 70%, 25%).

Figure 18B:
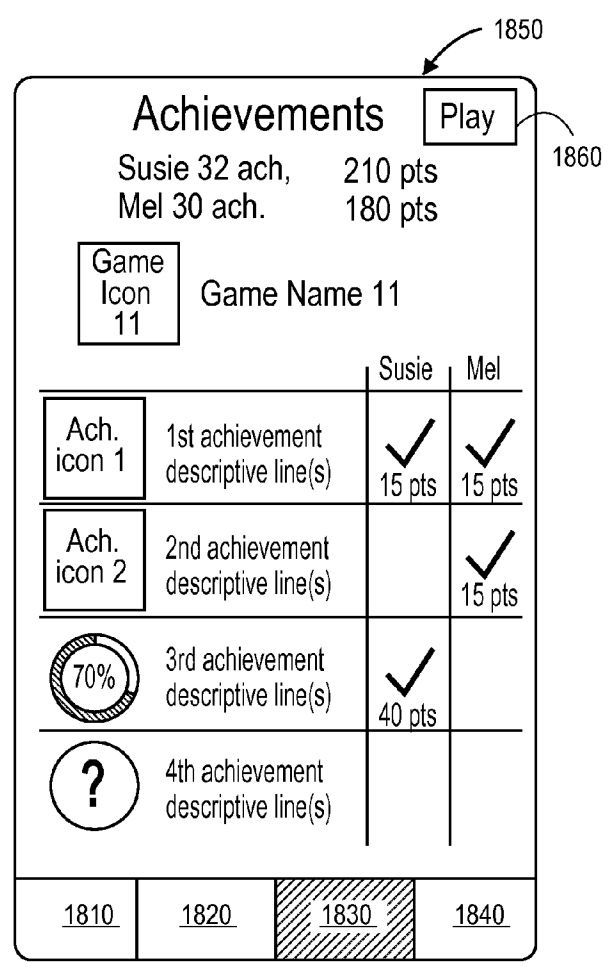

Returning to FIG. 15B, a selection of the option 1588 causes the processing logic to generate user interface 1850 as illustrated in FIG. 18B in one embodiment of the present invention. User interface 1850 includes a comparison of scores and achievements for the user and the selected friend with the scores being based on a number of achievements completed. For example, Susie has 210 points and 32 achievements and Mel has 180 points and 30 achievements for game name 11. User interface 1850 also includes a list of achievements for the previously selected game name (e.g., game name 11) and displays these achievements for the previously selected friend (e.g., Susie) and the user. For example, Susie has completed achievements 1 and 3 as illustrated in FIG. 18, but Susie has not completed achievements 2 and 4. The user has completed achievements 1 and 2 as illustrated by the icons 1 and 2, but has not completed achievements 3 and 4. Each achievement has a name, descriptive lines, and an icon if the user has completed the achievement. Otherwise, the icon is replaced with progress information that indicates in numerical and graphical form a current amount of progress toward completing the achievement (e.g., 70%, 25%). An icon may include a question mark indicator (?) if the user has made no progress or has made less than certain threshold of progress. A game of Game Name 11 can be started between Susie and Mel with the selection of play option 1860.

Returning to FIG. 15A, a selection of option 1570 from user interface 1500 causes the processing logic to generate a user interface for creating a communication (e.g., an email message). The user can send the communication to a friend.

The game center module and game service provide a game center in which a user can send and receive notifications (e.g., friend requests, game invitations, game updates, etc). FIGS. 21-27 illustrate exemplary user interfaces for friend requests and game invitations.

FIG. 21 illustrates an exemplary user interface 2100 having a list of notifications (e.g., friend requests, updates) in one embodiment of the present invention. A user selection of a notification option 2140 generates a user interface 2100 as illustrated in FIG. 21. The user interface 2100 includes a list of notifications 2150 received or sent by a user. A selection of option 2160 causes the processing logic to generate a list of notifications (e.g., friend requests, updates) received while a selection of option 2162 causes the processing logic to generate a list of notifications (friend requests, updates) sent. A user selection of option 2170 provides a list of the user's contacts and associated contact information (e.g., phone #, email address, URL, address, additional fields, etc.).

In an embodiment, an incoming friend request may be associated with an email address. The user's address book or contact information associated with the user's contacts can be searched to find a match with the email address. If a match occurs, then the incoming friend request will display a real name or nickname for the player who sent the incoming friend request to the user.

In one embodiment, option 2160 is selected and then user name 22 is also selected. FIG. 22 illustrates an exemplary user interface 2200 having a received friend request in one embodiment of the present invention. User interface 2200 is generated in response to the selection of user name 22 from the list 2150. The user interface 2200 includes details regarding the player that sent the friend request such as a representation (e.g., avatar) and a short message from this player. The user interface 2200 also includes accept option 2250 to accept a request, decline option 2252 to decline a request, optional view option 2254 to view more details regarding the request, and an optional dismiss option 2256 to dismiss the friend request and possibly block future requests from the same player for a certain time period or indefinitely.

In an embodiment, user interface 2200 includes options 2250, 2252, 2254, and 2256. In certain embodiments, options 2254 and 2256 are both not included or only one of these options is not included. In certain embodiments, various combinations of these options are possible. Options may also be provided that permit a user to defriend a current friend, decline a friend request once and never receive another invite from this player, or limit friend requests in time (e.g., 1 invite/week).

The user interface 2200 also includes a report concern option 2260 to report a concern regarding the player that sent the invitation. A user selection of the request option 2270 causes the generation of the user interface 2100.

FIG. 23 illustrates an exemplary user interface 2300 having a send friend request communication in one embodiment of the present invention. The user interface 2300 may be generated in response to various user selections. For example, the user interface 2300 is generated in response to a user selection from a friend list (e.g., option 1070), a request list (e.g., option 2170), or a recently played option (e.g., send friend request 2050).

In one embodiment, the user interface 2300 includes a send option 2350 to send the friend request communication to a player, a cancel option 2352 to cancel the communication, a To field 2380 that displays the selected player's user name and is associated with an email address, a text field 2360 for composing a message, and a virtual keyboard 2370. The user interface 2300 may represent an email message. A user selection of the send option 2350 causes an alert message 2400 as illustrated in FIG. 24 to appear on a graphical user interface of the system in one embodiment of the present invention. The alert message 2400 indicates that the friend request has been sent and the friend will be added to the user's friend list upon acceptance. A selection of an acknowledgement option 2410 will clear the alert message 2400 from the graphical user interface.

In an embodiment, the To field 2380 is prefilled with a user name based on a previous user selection (e.g., selection of option 2050). Alternatively, a user can enter contact information (e.g., name, nickname, alias, email address, phone number) into the field 2380. In another embodiment, a user can select option 2354 and search for contact information for a player to invite from the user's contacts or address book. The user may be able to determine from the contact information whether a particular player is registered with the game service associated with the game center module.

After a user selects the send option 2350, a server associated with the game service receives the contact information in the field 2380. If the contact information is an email address, then the server uses the email address to find a matching email in email accounts registered with the game service or account service. The recipient of the friend request then receives a push notification that appears in the game center module associated with the recipient. If the contact information is not an email address (e.g., alias), then an email address for the recipient can be found using the contact information if the recipient is registered with the game service. Otherwise, if the recipient is not registered with the game service, then an external social network (e.g., Facebook, Twitter) can be searched to find an email address for the recipient. For example, Facebook data can be obtained for the recipient and an email sent to Facebook with this email requesting the email address of the recipient.

In one embodiment, the recipient has a client system (e.g., Apple iPod Touch®, Apple iPhone®, Apple iPad®) and an account with the game service. Upon receipt of the friend request, the game center module of the recipient is launched and the recipient can accept the friend request.

In an embodiment, the recipient has the client system, but does not have an account with the game service. Upon receipt of the friend request, the game center module of the recipient is launched and the recipient receives a recommendation to join the game service associated with the game center module. In another embodiment, the recipient does not have a client system. In this case, the recipient receives the email message and can be directed to web page to join the game service.

Figure 25:
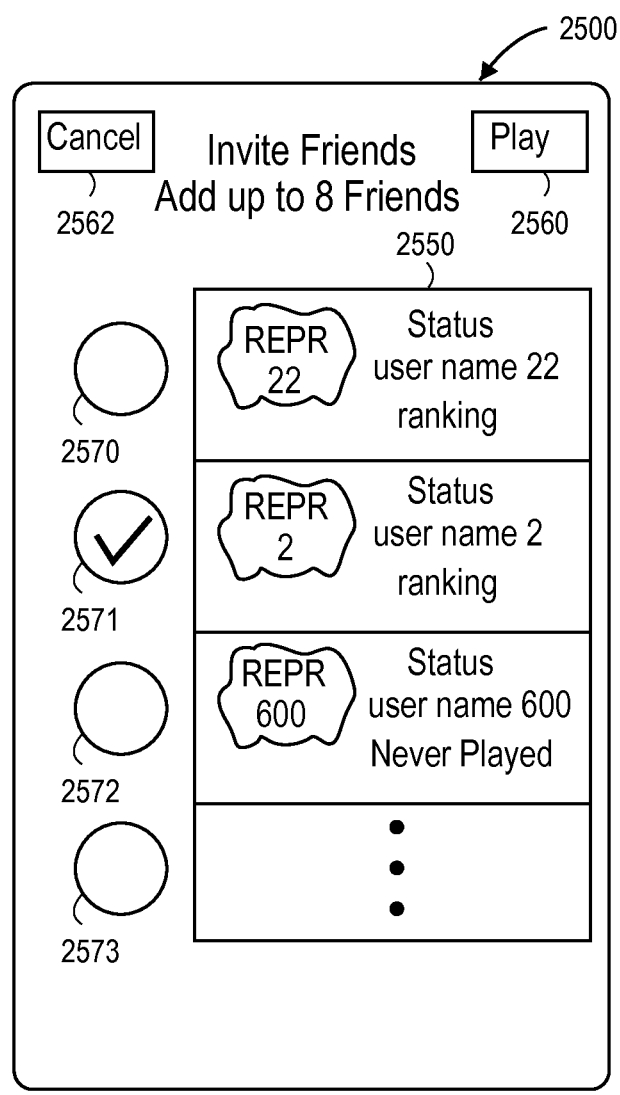

FIGS. 25-27 illustrate user interfaces (e.g., graphical user interfaces) provided by a game center module during a multi-player gaming experience in one embodiment of the present invention. After a user has initiated a multi-player gaming application, the user interface 2500 is generated to allow the user to invite between a minimum and a maximum number of players for the multi-player game. The user interface 2500 includes a list of the user's friends that can be invited individually or simultaneously for playing the multi-player game with the user. A user can select one or more friends with options 2570-2573 and then can select play or done option 2560 or cancel with option 2562. If a user selects option 2560, then user interface 2600 is generated. User interface 2600 includes a list of players 2650 associated with positions or slots (e.g., 2680, 2682, 2684, 2686) for the multi-player game. The multi-player game in this example requires 4 to 8 players. In other embodiments, fewer than 4 players may be needed or more than 8 players may be allowed. The players may have established peer to peer connections at this time of waiting in a "lobby" for the players to be assembled. The players may exchange messages or chat with each other. The user can control the lobby environment and mute and/or alter player volume levels.

The list 2650 includes four positions that are filled with the user (e.g., Mel), an invited friend (e.g., user name 1) that has received an invite but not yet responded, and two auto-match players that will be filled automatically by the game service and matchmaker 111. The list 2650 may include four additional positions for this example. The user can select at least one friend based on one or more factors (e.g., gaming abilities) of the user's friends for the multi-player gaming application.

The matchmaker service can perform the auto-matching and can select auto-match players based on various factors (e.g., player skill level, leaderboard rankings, achievement score, user's ratings, location, time zone, players that are ready to play, age, etc.).

The user interface 2600 also includes a play now option 2660, a cancel option 2662, an add player option 2670, and a remove player option 2672. In an embodiment, a user selection of an add player option 2670 causes the generation of user interface 2500 and the user can add one or more players by selecting one or more friends. The add player option 2670 can be disabled if a maximum number of players for the game has been reached. A user selection of a remove player option 2672 allows the user to remove one or more players by selecting one or more players that have filled one of the positions listed in list 2650. The remove player option 2672 can be disabled if a minimum number of players for the game has been reached.

A user selection of an uninvite option 2652 and subsequent confirmation allows the user to replace the current player (e.g., user name 1) with a player selected automatically by the matchmaker service or a player selected by the user. A user selection of an invite friend option 2654 or 2656 allows the user to replace the auto-match player with a player selected by the user. For example, a user can select the invite option 2654 and invite a friend (e.g., user name 2). These selections cause the generation of user interface 2700. The auto-match position 2684 associated with invite option 2654 has been replaced with a friend (e.g., user name 2) associated with position 2784 having an uninvite option 2754 in user interface 2700. Additionally, user name 1 has accepted the invite and the status for position 2782 has been updated to "Ready." The auto-match option 2652 has been removed from this position because user name 1 has accepted the invite.

In an embodiment, if user name 1 had declined the invite from the user, then position 2682 or 2782 briefly changes colors and/or flashes. Then, the position reverts to auto-matching. If the invited friend (e.g., user name 1) fails to respond within a certain time period or frequency, then the invited friend is replaced with auto-matching. Alternatively, the invited player can always decline invites from certain other players. The user selected positions and auto-match positions can be ordered with the user selected positions listed first near the top of the user interface.

In an embodiment, one player position has a ready status, two other positions have a waiting status, and remaining positions are filled with auto-matching. If one player selects a play now option (e.g., 2660, 2760), then the game can begin with the player with the ready status and auto-matching players for the other positions. Additional auto-matching players can be added if necessary to meet the minimum player requirement of the game. An alert may be generated indicating that play is beginning without the friends that have a waiting status. In one embodiment, an alert may be generated indicating that a problem needs to be resolved before play can begin or the alert can be generated during play. If Mel drops out of the game or loses connectivity at the time of initiation of the game, then his position can be replaced with an auto-match player.

Figure 29:
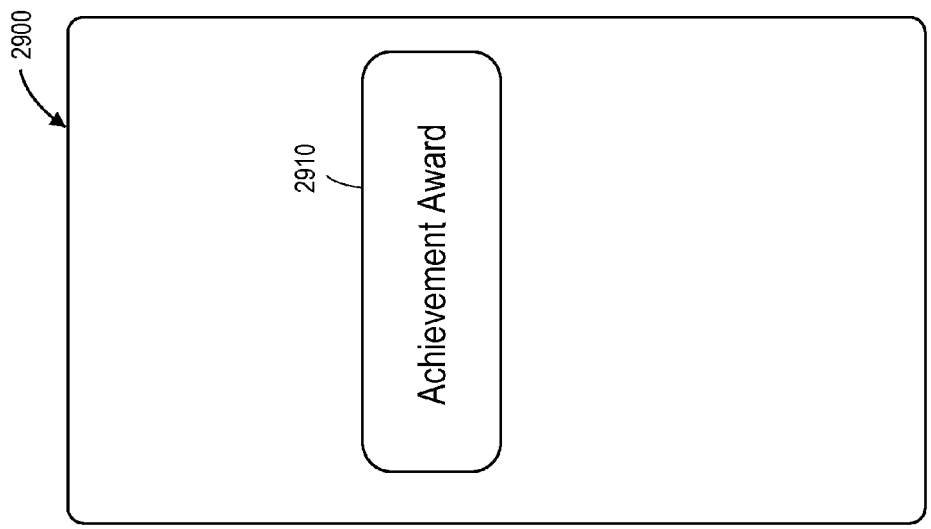
FIG. 29 illustrates an exemplary achievement award 2910 that slides across an user interface 2900 in one embodiment of the present invention.
Figure 28:
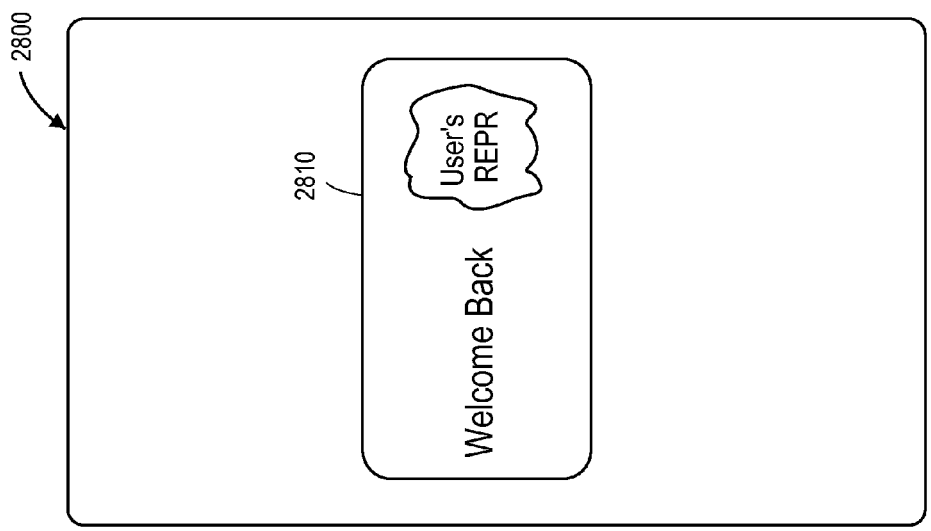
FIG. 28 illustrates an exemplary welcome alert 2810 that slides across a user interface 2800 in one embodiment of the present invention.

In certain embodiments, alerts within a game are provided. For example, upon entering a game a welcome alert may slide across the graphical user interface. FIG. 28 illustrates an exemplary welcome alert 2810 that slides across a user interface 2800 in one embodiment of the present invention. FIG. 29 illustrates an exemplary achievement award 2910 that slides across a graphical user interface 2900 in one embodiment of the present invention. The achievement award 2910 is generated in response to a user completing an achievement.

In an embodiment, a user can report a concern regarding a player from within a game. A user can also display ratings for other players from within a game.

The user interfaces discussed in the present disclosure are merely examples. Other variations and modifications are within the scope of the present disclosure. For example, some user interfaces have been shown with four options (e.g., profile option, friend option, games option, notifications option) near the bottom of the user interfaces. These options can be located in other locations on the user interfaces or not displayed at all.

Figure 30:
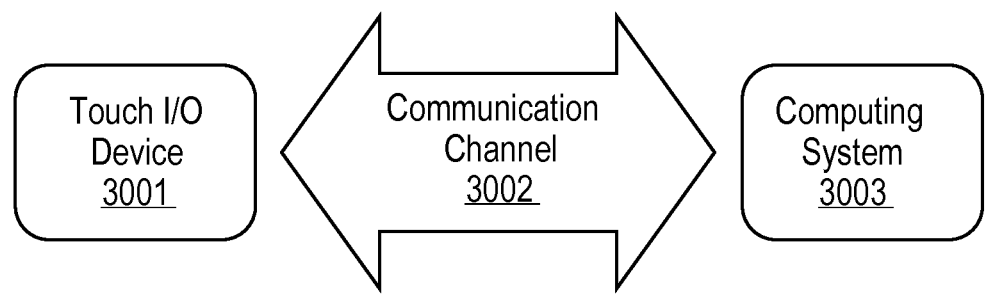
FIG. 30 illustrates a touch I/O system 3001 that can receive touch input for interacting with computing system 3003 via wired or wireless communication channel 3002 in one embodiment of the present invention.

Described embodiments may include touch I/O device 3001 that can receive touch input for interacting with computing system 3003 as illustrated in FIG. 30 via wired or wireless communication channel 3002 in one embodiment of the present invention. Touch I/O device 3001 may be used to provide user input to computing system 3003 in lieu of or in combination with other input devices such as a keyboard, mouse, etc. One or more touch I/O devices 3001 may be used for providing user input to computing system 3003. Touch I/O device 3001 may be an integral part of computing system 3003 (e.g., touch screen on a laptop) or may be separate from computing system 3003.

Touch I/O device 3001 may include a touch sensitive panel which is wholly or partially transparent, semitransparent, non-transparent, opaque or any combination thereof. Touch I/O device 3001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 3001 embodied as a touch screen may include a transparent and/or semitransparent touch sensitive panel partially or wholly positioned over at least a portion of a display. According to this embodiment, touch I/O device 3001 functions to display graphical data transmitted from computing system 3003 (and/or another source) and also functions to receive user input. In other embodiments, touch I/O device 3001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 3001 may be configured to detect the location of one or more touches or near touches on device 3001 based on capacitive, resistive, optical, acoustic, inductive, mechanical, chemical measurements, or any phenomena that can be measured with respect to the occurrences of the one or more touches or near touches in proximity to device 3001. Software, hardware, firmware or any combination thereof may be used to process the measurements of the detected touches to identify and track one or more gestures. A gesture may correspond to stationary or non-stationary, single or multiple, touches or near touches on touch I/O device 3001. A gesture may be performed by moving one or more fingers or other objects in a particular manner on touch I/O device 3001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 3003 may drive a display with graphical data to display a graphical user interface (GUI). The GUI may be configured to receive touch input via touch I/O device 3001. Embodied as a touch screen, touch I/O device 3001 may display the GUI. Alternatively, the GUI may be displayed on a display separate from touch I/O device 3001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 3001 which may be associated with the graphical elements of the graphical user interface (GUI). In other embodiments, the user may perform gestures at one or more locations that are independent of the locations of graphical elements of the GUI. Gestures performed on touch I/O device 3001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen.

Alternatively, a touch pad generally provides indirect interaction. Gestures may also affect non-displayed GUI elements (e.g., causing user interfaces to appear) or may affect other actions within computing system 3003 (e.g., affect a state or mode of a GUI, application, or operating system). Gestures may or may not be performed on touch I/O device 3001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 3002 in response to or based on the touch or near touches on touch I/O device 3001. Feedback may be transmitted optically, mechanically, electrically, olfactory, acoustically, or the like or any combination thereof and in a variable or non-variable manner.

Figure 31:
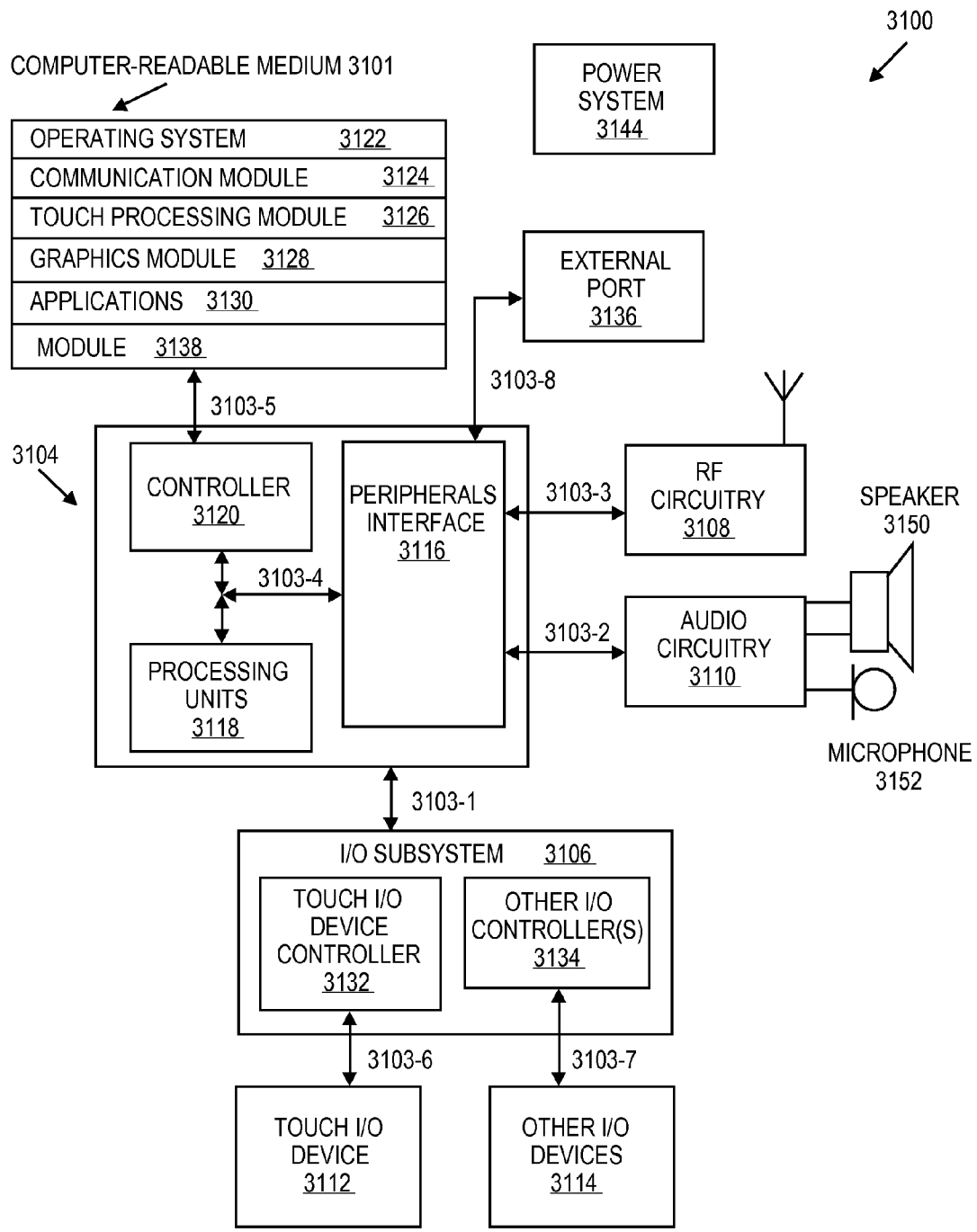
FIG. 31 shows a wireless system which includes the capability for wireless communication in one embodiment of the present invention.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 3100, including combinations of two or more of these types of devices. FIG. 31 is a block diagram of one embodiment of the present invention of system 3100 that generally includes one or more computer-readable mediums 3101, processing system 3104, Input/Output (I/O) subsystem 3106, radio frequency (RF) circuitry 3108 and audio circuitry 3110. These components may be coupled by one or more communication buses or signal lines 3103.

It should be apparent that the architecture shown in FIG. 31 is only one example architecture of system 3100, and that system 3100 could have more or fewer components than shown, or a different configuration of components. The various components shown in FIG. 31 can be implemented in hardware, software, firmware or any combination thereof, including one or more signal processing and/or application specific integrated circuits.

RF circuitry 3108 is used to send and receive information over a wireless link or network to one or more other devices and includes well-known circuitry for performing this function. RF circuitry 3108 and audio circuitry 3110 are coupled to processing system 3104 via peripherals interface 3116. Interface 3116 includes various known components for establishing and maintaining communication between peripherals and processing system 3104. Audio circuitry 3110 is coupled to audio speaker 3150 and microphone 3152 and includes known circuitry for processing voice signals received from interface 3116 to enable a user to communicate in real-time with other users. In some embodiments, audio circuitry 3110 includes a headphone jack (not shown).

Peripherals interface 3116 couples the input and output peripherals of the system to processor 3118 and computer-readable medium 3101. One or more processing units 3118 communicate with one or more computer-readable mediums 3101 via controller 3120. Computer-readable medium 3101 can be any device or medium (e.g., storage device, storage medium) that can store code and/or data for use by one or more processing units 3118. Medium 3101 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 3101 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processing units 3118 run various software components stored in medium 3101 to perform various functions for system 3100. In some embodiments, the software components include operating system 3122, communication module (or set of instructions) 3124, touch processing module (or set of instructions) 3126, graphics module (or set of instructions) 3128, one or more applications (or set of instructions) 3130, and game center module [or set of instructions] 3138. In an embodiment, a game center application is associated with a game center module 3138 that includes sub-modules (e.g., profile 210, friends 220, games 230, notifications 240). Each of these modules, sub-modules, and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments.

In some embodiments, medium 3101 may store a subset of the modules and data structures identified above. Furthermore, medium 3101 may store additional modules and data structures not described above.

Operating system 3122 includes various procedures, sets of instructions, software components and/or drivers for controlling and managing general system tasks (e.g., memory management, storage device control, power management, etc.) and facilitates communication between various hardware and software components.

Communication module 3124 facilitates communication with other devices over one or more external ports 3136 or via RF circuitry 3108 and includes various software components for handling data received from RF circuitry 3108 and/or external port 3136.

Graphics module 3128 includes various known software components for rendering, animating and displaying graphical objects on a display surface. In embodiments in which touch I/O device 3112 is a touch sensitive display (e.g., touch screen), graphics module 3128 includes components for rendering, displaying, and animating objects on the touch sensitive display.

One or more applications 3130 can include any applications installed on system 3100, including without limitation, a game center application, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 3126 includes various software components for performing various tasks associated with touch I/O device 3112 including but not limited to receiving and processing touch input received from I/O device 3112 via touch I/O device controller 3132.

System 3100 may further include game center module 3138 having sub-modules (e.g., profile 210, friends 220, games 230, notifications 240) for performing the method/functions as described herein in connection with FIGS. 3-8. In one embodiment, the game center module 3138 may at least function to provide customized player specific options and statistics. For example, the game center module may provide a user with the ability to build and modify a list of friends within the gamecenter. The user can select a specific friend and view games played with the friend, games in common, and games owned by the friend but not by the user. The user can view rankings and achievements for each of these games. The user can select one of these games to generate game details having a leaderboard option. Upon selection of the leaderboard option the game center module 3138 generates a leaderboard for the user and the friend. The game center module 3138 also provides the ability for a user to obtain a game owned by the friend, but not owned by the user.

In another embodiment, a system (e.g., 3003, 3100) includes a computer-readable medium (e.g., 3101) that stores a game center module 3138, one or more processing units (e.g., 3118) that execute a set of instructions associated with the game center module 3138, and an input/output device (e.g., 3001, 3112). The one or more processing units may be configured to receive a selection of a friends option of the game center module, to send data to be presented to the input/output device. The data is indicative of a list of friends. The one or more processing unit also may be configured to receive a selection of a friend from the list of friends and to send data to be presented to the input/output device. The data is indicative of friend details of the selected friend including a first list of games played together between a user and the selected friend and a second list of other games in common between the user and the selected friend. The first list of games may include a list of options with each option indicating a respective game name and a comparison of the user's ranking and the selected friend's ranking for the respective game. The second list of games may also include a list of options with each option indicating a respective game name and a comparison of the user's ranking and the selected friend's ranking for the respective game.

In another embodiment, the game center module provides customized game details based on being accessed via a friends option or a games option. The game center module 3138 provides gaming details of a selected game with the gaming details having comparison information for a selected friend and the user if the user selects the friends option and the gaming details having user information if the user selects the games option. The comparison information can include a leaderboard option that indicates a comparison of a user's ranking and the friend's ranking for the selected game. The comparison information may also include an achievement option that indicates a comparison of a user's set of achievements and a friend's set of achievements for the selected game. The user information can include a leaderboard option that indicates a user's ranking for the selected game and an achievement option that indicates a user's set of achievements for the selected game.

In another embodiment, the game center module 3138 can provide a user with an invite from a specific friend of the user to play a specific game. The game center module 3138 determines whether the user owns the specific game and provides a game option to access the specific game if the user does not own the specific game.

Module 3138 may also interact with game center application 3130 to provide the methods and functionality described herein. Module 3138 may be embodied as hardware, software, firmware, or any combination thereof. Although module 3138 is shown to reside within medium 3101, all or portions of module 3138 may be embodied within other components within system 3100 or may be wholly embodied as a separate component within system 3100.

I/O subsystem 3106 is coupled to touch I/O device 3112 and one or more other I/O devices 3114 for controlling or performing various functions. Touch I/O device 3112 communicates with processing system 3104 via touch I/O device controller 2032, which includes various components for processing user touch input (e.g., scanning hardware). One or more other input controllers 2034 receives/sends electrical signals from/to other I/O devices 3114. Other I/O devices 3114 may include physical buttons, dials, slider switches, sticks, keyboards, touch pads, additional display screens, or any combination thereof.

If embodied as a touch screen, touch I/O device 3112 displays visual output to the user in a GUI. The visual output may include text, graphics, video, and any combination thereof. Some or all of the visual output may correspond to user-interface objects. Touch I/O device 3112 forms a touch-sensitive surface that accepts touch input from the user. Touch I/O device 3112 and touch screen controller 3132 (along with any associated modules and/or sets of instructions in medium 3101) detects and tracks touches or near touches (and any movement or release of the touch) on touch I/O device 3112 and converts the detected touch input into interaction with graphical objects, such as one or more user-interface objects. In the case in which device 3112 is embodied as a touch screen, the user can directly interact with graphical objects that are displayed on the touch screen. Alternatively, in the case in which device 3112 is embodied as a touch device other than a touch screen (e.g., a touch pad), the user may indirectly interact with graphical objects that are displayed on a separate display screen embodied as I/O device 3114.

Touch I/O device 3112 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 3112 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 3112 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 3100 also includes power system 3144 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 3116, one or more processing units 3118, and memory controller 3120 may be implemented on a single chip, such as processing system 3104. In some other embodiments, they may be implemented on separate chips.

In certain embodiments of the present disclosure, the system 3003 or system 3100 or combinations of systems 3003 or 3100 can be used to implement at least some of the methods discussed in the present disclosure.

Some portions of the detailed descriptions are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations.

The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program (e.g., game center application) to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 32:
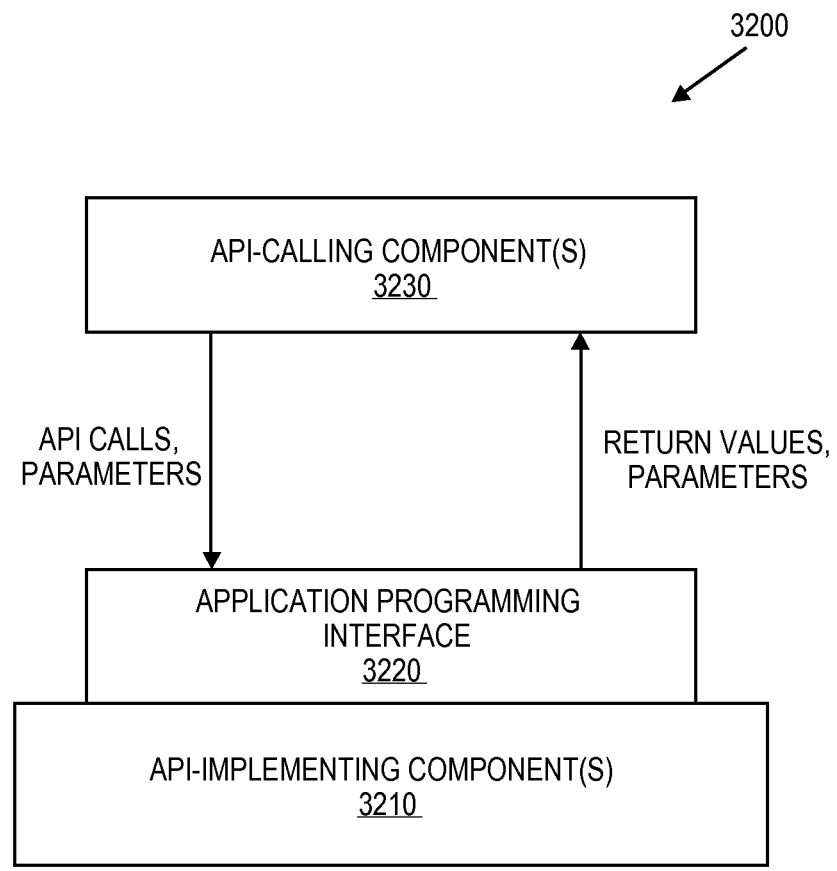
FIG. 32 is a block diagram illustrating an exemplary API architecture, which may be used in one embodiment of the present invention.

FIG. 32 is a block diagram illustrating an exemplary API architecture, which may be used in one embodiment of the present invention. As shown in FIG. 32, the API architecture 3200 includes the API-implementing component 3210 (e.g., an operating system, a library, a device driver, an API, an application program, software or other module) that implements the API 3220. The API 3220 specifies one or more functions, methods, classes, objects, protocols, data structures, formats and/or other features of the API-implementing component that may be used by the API-calling component 3230. The API 3220 can specify at least one calling convention that specifies how a function in the API-implementing component receives parameters from the API-calling component and how the function returns a result to the API-calling component. The API-calling component 3230 (e.g., an operating system, a library, a device driver, an API, an application program, software or other module) makes API calls through the API 3220 to access and use the features of the API-implementing component 3210 that are specified by the API 3220. The API-implementing component 3210 may return a value through the API 3220 to the API-calling component 3230 in response to an API call.

It will be appreciated that the API-implementing component 3210 may include additional functions, methods, classes, data structures, and/or other features that are not specified through the API 3220 and are not available to the API-calling component 3230. It should be understood that the API-calling component 3230 may be on the same system as the API-implementing component 3210 or may be located remotely and accesses the API-implementing component 3210 using the API 3220 over a network. While FIG. 32 illustrates a single API-calling component 3230 interacting with the API 3220, it should be understood that other API-calling components, which may be written in different languages (or the same language) than the API-calling component 3230, may use the API 3220.

The API-implementing component 3210, the API 3220, and the API-calling component 3230 may be stored in a machine-readable medium (e.g., computer-readable medium), which includes any mechanism for storing information in a form readable by a machine (e.g., a computer or other data processing system). For example, a machine-readable medium includes magnetic disks, optical disks, random access memory; read only memory, flash memory devices, etc.

Figure 33:
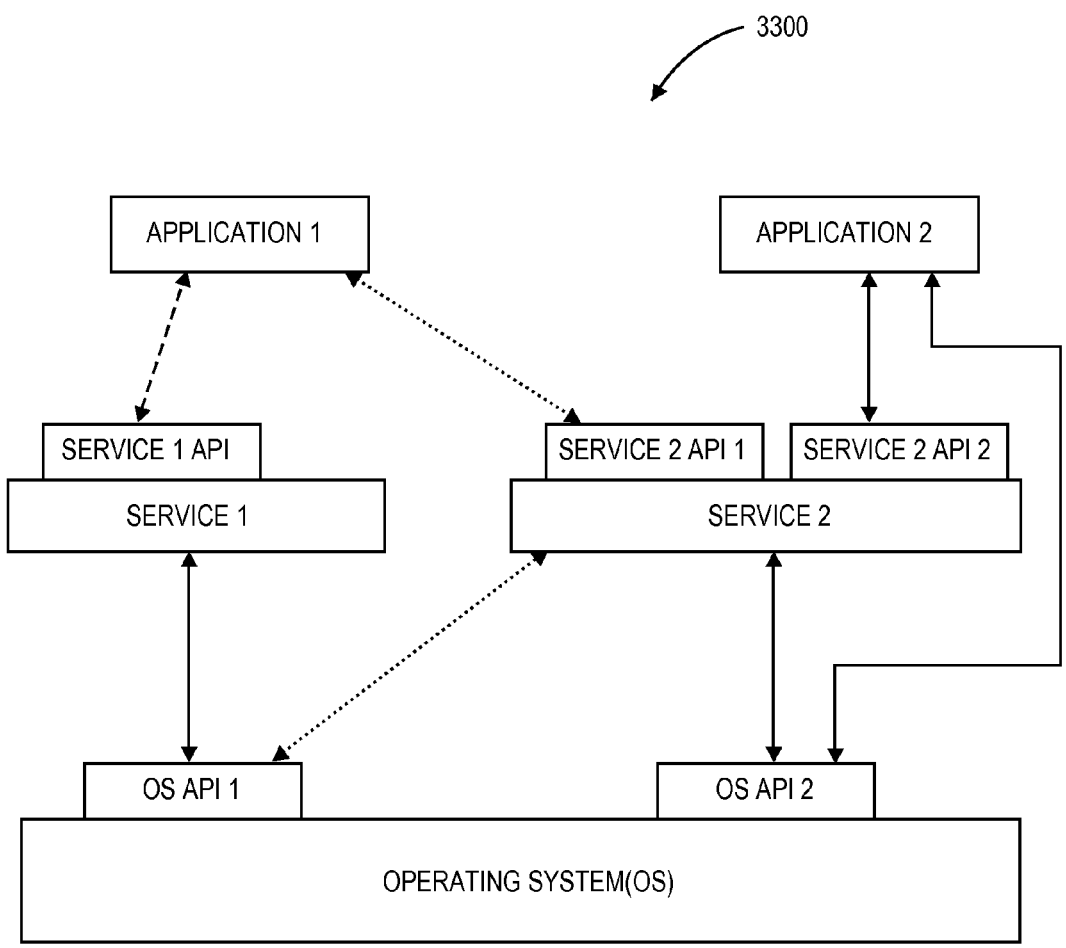
In FIG. 33 ("Software Stack"), in one embodiment of the present invention, applications can make calls to Services A or B using several Service APIs and to Operating System (OS) using several OS APIs.

In FIG. 33 ("Software Stack"), in one embodiment of the present invention, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 34:
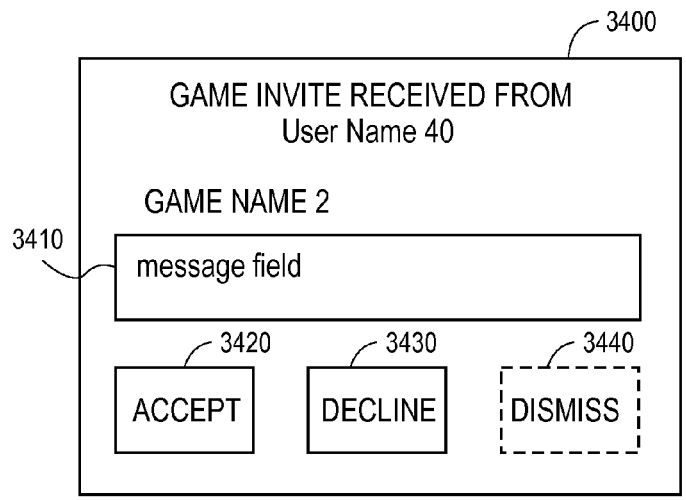
FIGS. 34-36 illustrate exemplary alerts or notifications presented to a user interface upon receiving a game invite in one embodiment of the present invention.
Figure 35:
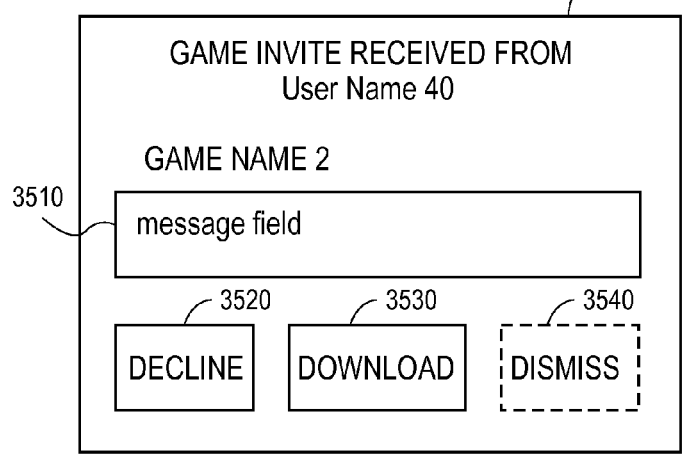
Figure 36:
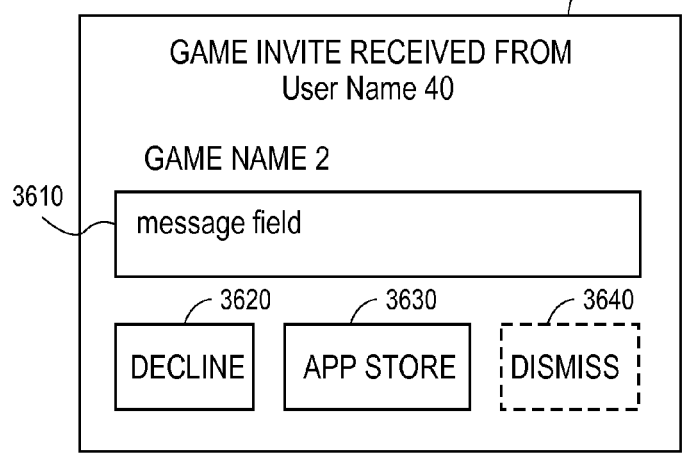

FIGS. 34-36 illustrate exemplary alerts or notifications presented to a graphical user interface upon receiving a game invite in one embodiment of the present invention. Initially, a system of a user receives an invite from a specific player (e.g., friend from user's list of friends, non-friend) of the user to play a specific game. Processing logic determines whether the game associated with the game invite is owned by the user on the current system, owned but not on the current system, or not owned by the user. The invite may be in the form of an alert 3400 if the game is owned by the user on the current system. The alert 3400 includes a user name (e.g., user name 40) of the player that sent the invite, a game name (e.g., game name 2), and a message field 3410. The player that creates the invite composes a message in the message field 3410.

If the user owns the game (e.g., game name 2) on the user's current system, then the alert 3400 also includes an accept option 3420 to accept the specific game, a decline option 3420 to decline the game invite, and an optional dismiss option to dismiss the game invite. Selection of the dismiss option allows the user to decide at a later time whether to decline or access the game.

The invite may be in the form of an alert 3500 if the user owns the game, but not on the current system being used by the user. The alert 3500 includes a user name (e.g., user name 40) of the player that sent the invite, a game name (e.g., game name 2), and a message field 3510. The player that creates the invite composes a message in the message field 3510.

The alert 3500 also includes a decline option 3520 to decline the game invite, a download option 3530 to download the game from an online application service (e.g., application store), and an optional dismiss option to dismiss the game invite. Selection of the dismiss option allows the user to decide at a later time whether to decline or download the game.

The invite may be in the form of an alert 3600 if the user does not own the game. The alert 3600 includes a user name (e.g., user name 40) of the player (e.g., friend) that sent the invite, a game name (e.g., game name 2), and a message field 3610. The alert 3500 also includes a decline option 3620 to decline the game invite, an access option 3530 (e.g., app store, buy) to access a fully functional or limited version of the game from an online application service (e.g., application store), and an optional dismiss option 3640 to dismiss the game invite. Selection of the dismiss option 3640 allows the user to decide at a later time whether to decline or download the game.

Upon a user selection of the access option 3630, the processing logic automatically directs the user to an application service (e.g., application store) to purchase the specific game in response to a user selection of the access option (e.g., buy, application store). Alternatively, the processing logic may automatically direct, in response to the user selection of the access option, the user to the application service to access for free a fully functional version of the game for a limited time period or a limited functionality demo copy. In one embodiment, a game invite includes at least one of a graphical icon for the game, a game name, a rating for the game, an ability to access the game, and a price for purchasing the game.

Figure 37:
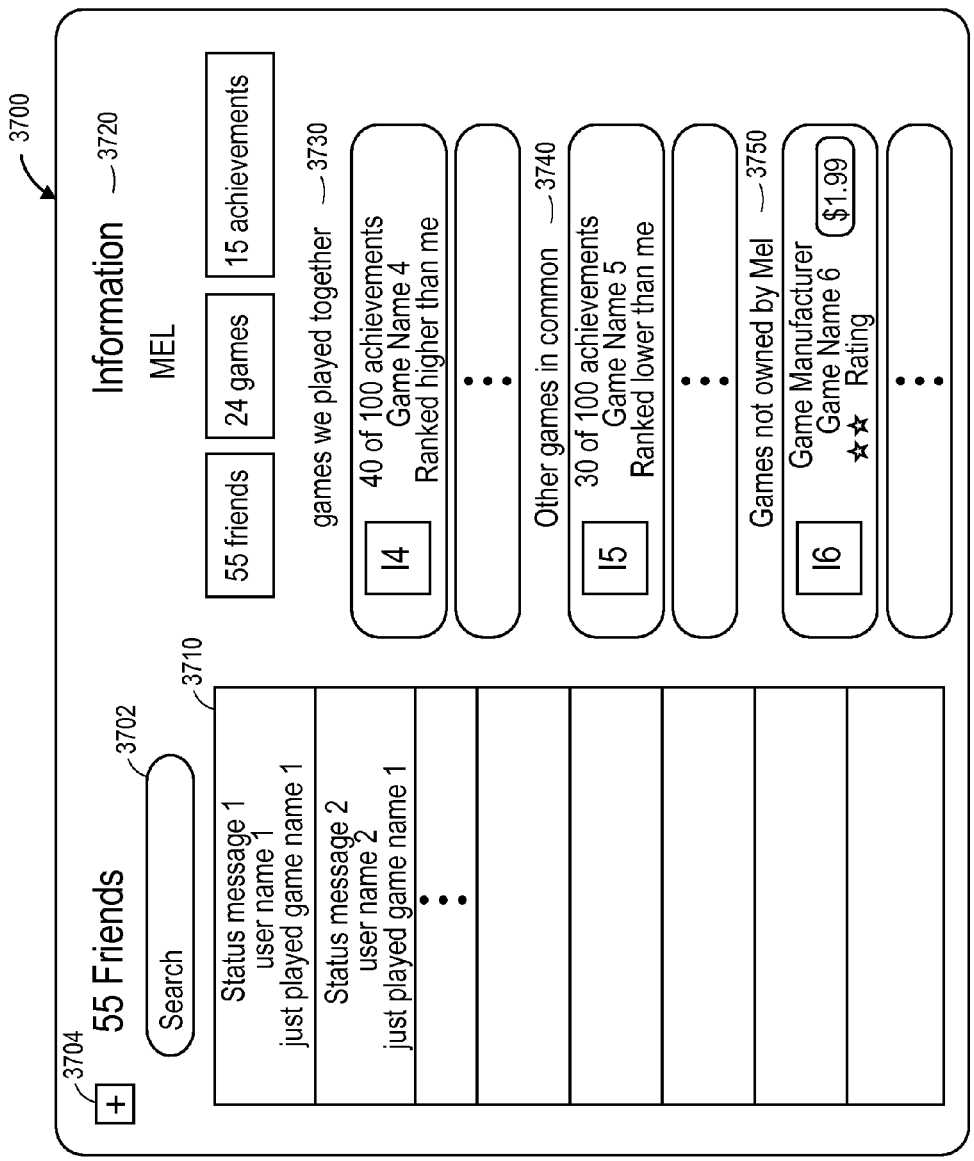
FIGS. 37-42 illustrate exemplary user interfaces designed for certain systems in one embodiment of the present invention.

FIGS. 37-42 illustrate exemplary user interfaces designed for systems with larger displays in one embodiment of the present invention. For example, these systems may include any system or device having a display larger than a display of a mobile phone device. FIG. 37 illustrates a user interface 3700 with a searchable list of friends and additional information in accordance with one embodiment. User interface 3700 includes content similar to that of the user interfaces illustrated in FIGS. 10 and 11B. The user interface 3700 includes a search option 3702 and a list of friends 3710. A user selection of option 3704 provides a list of the user's contacts and associated contact information (e.g., phone #, email address, URL, address, additional fields, etc.).

The user interface 3700 also includes information 3720, which includes a user's name (e.g., Mel), a number of friends, a number of games played, and a number of achievements. The information 3720 also includes games we played together 3730 (e.g, games that Mel and a selected friend have played together), other games in common 3740, and games not owned by Mel 3750.

Figure 38:
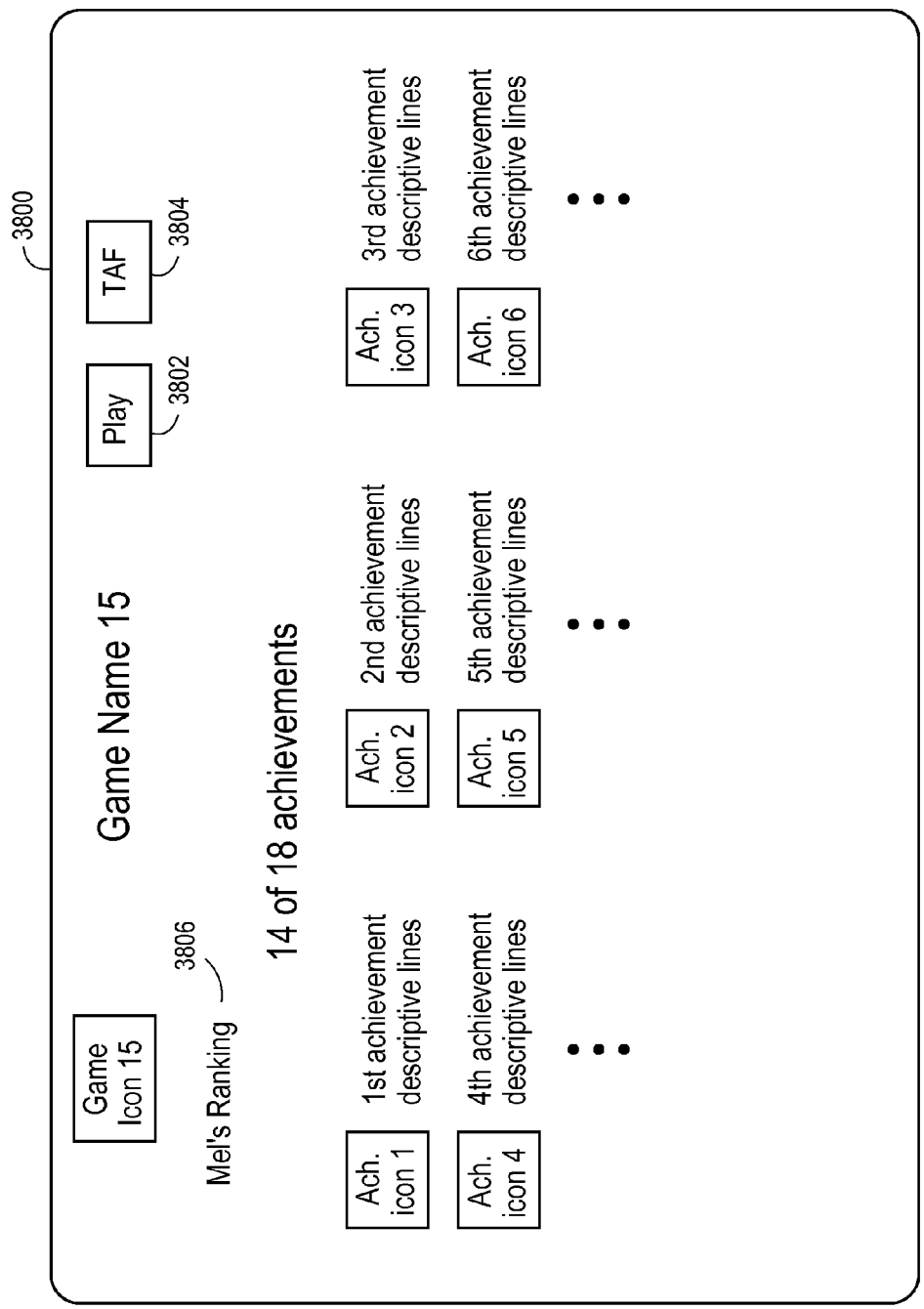

FIG. 38 illustrates a user interface 3800 with achievement information for a particular game in accordance with one embodiment. The user interface 3800 includes a game name, a play option 3802, a tell a friend option 3804, a ranking 3806 for the game, a number of achievements for the game, and achievements (e.g., 18 achievements) for the game.

Figure 39:
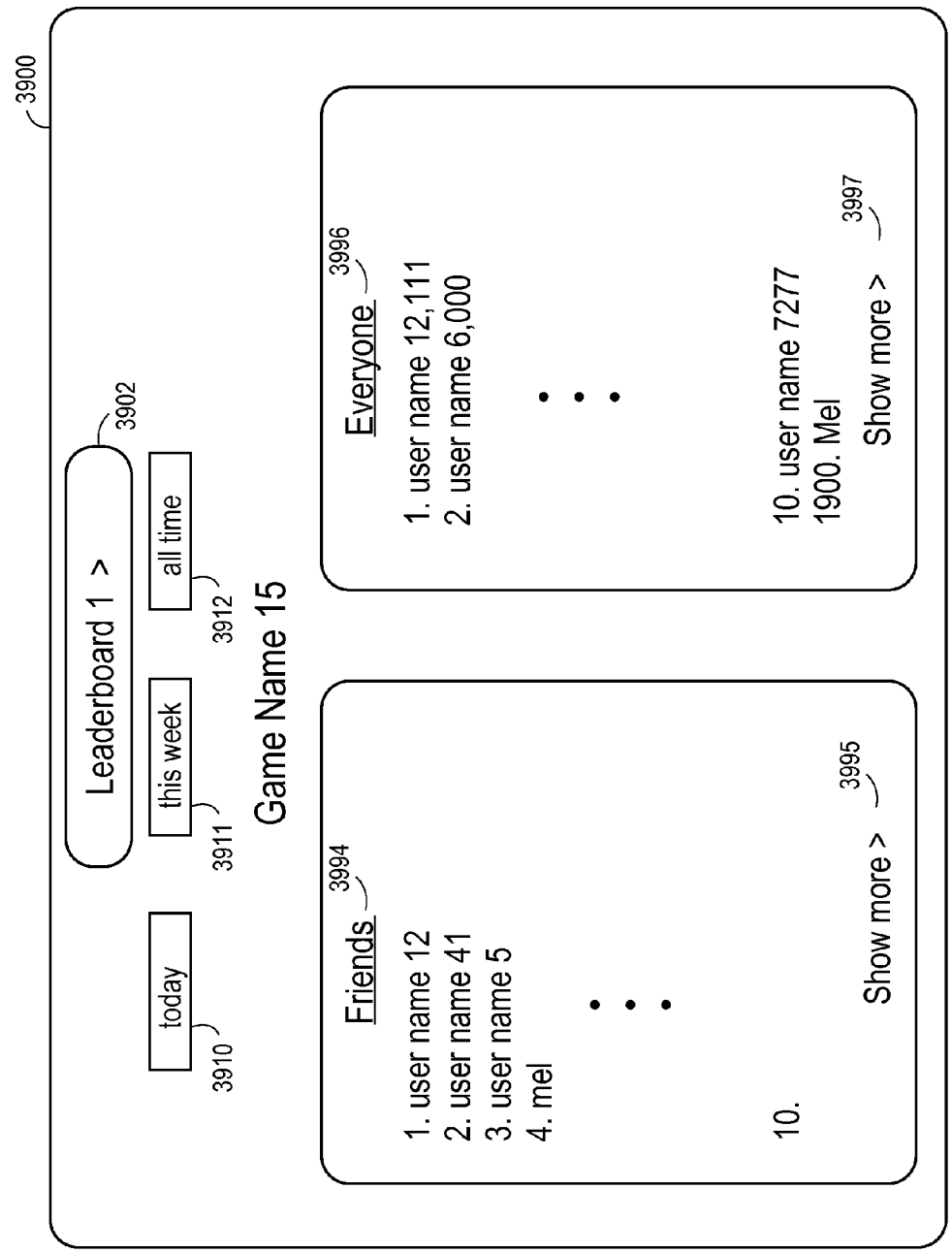

FIG. 39 illustrates a user interface 3900 with leaderboard information for a particular game in accordance with one embodiment. User interface 3900 includes a selectable leaderboard option 3902 to selected among different leaderboards (e.g., leaderboard 1, leaderboard 2, etc.). For example, Game Name 15 may include 4 different tracks that are not related to each. A different leaderboard can be generated for each track. A merged leaderboard may include rankings aggregated from all tracks. The user interface 3900 includes a today option 3950, a this week option 3911, and an all time option 3912. The list of leaders can be filtered and ranked based on these options.

Friends 3994 includes a ranked list of Mel's friends for Game Name 11. Everyone 3996 includes a ranked list of all users for Game Name 15.

In certain embodiments, a certain number of top players are listed (e.g., 10, 20) and if the user (e.g., Mel) is not in this list, then the user's ranking is also listed (e.g., 1900th). A show more option (e.g., 3995, 3997) can be selected to display additional player rankings.

Figure 40:
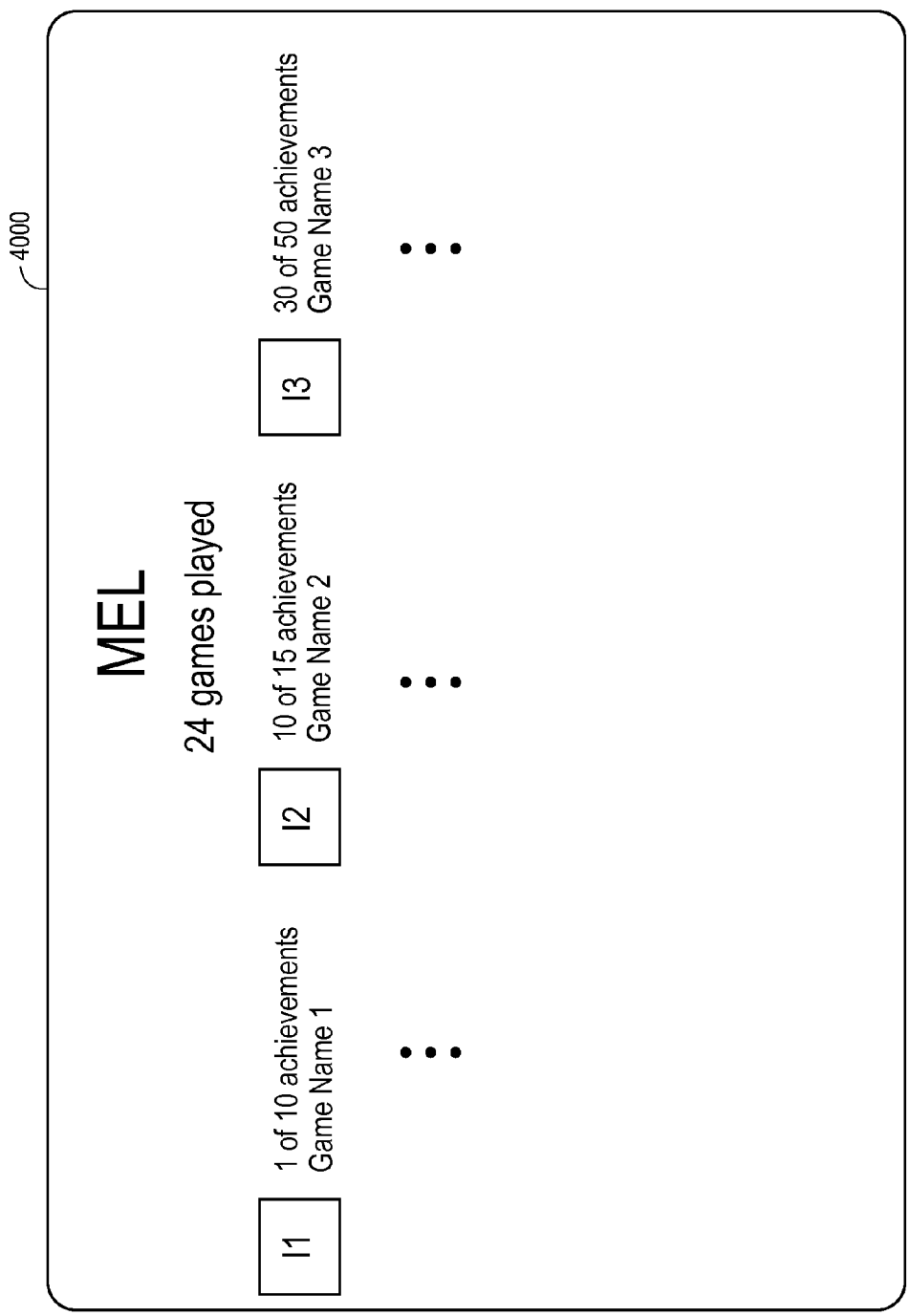

FIG. 40 illustrates a user interface 4000 that displays games played for a particular user in accordance with one embodiment. The user interface 4000 includes a user name (e.g., Mel), a number of games played for the user, and the games played (e.g., 24 games played) for the user. The gaming information for each game includes a game icon, a number of completed achievements for the game, and a game name.

Figure 41:
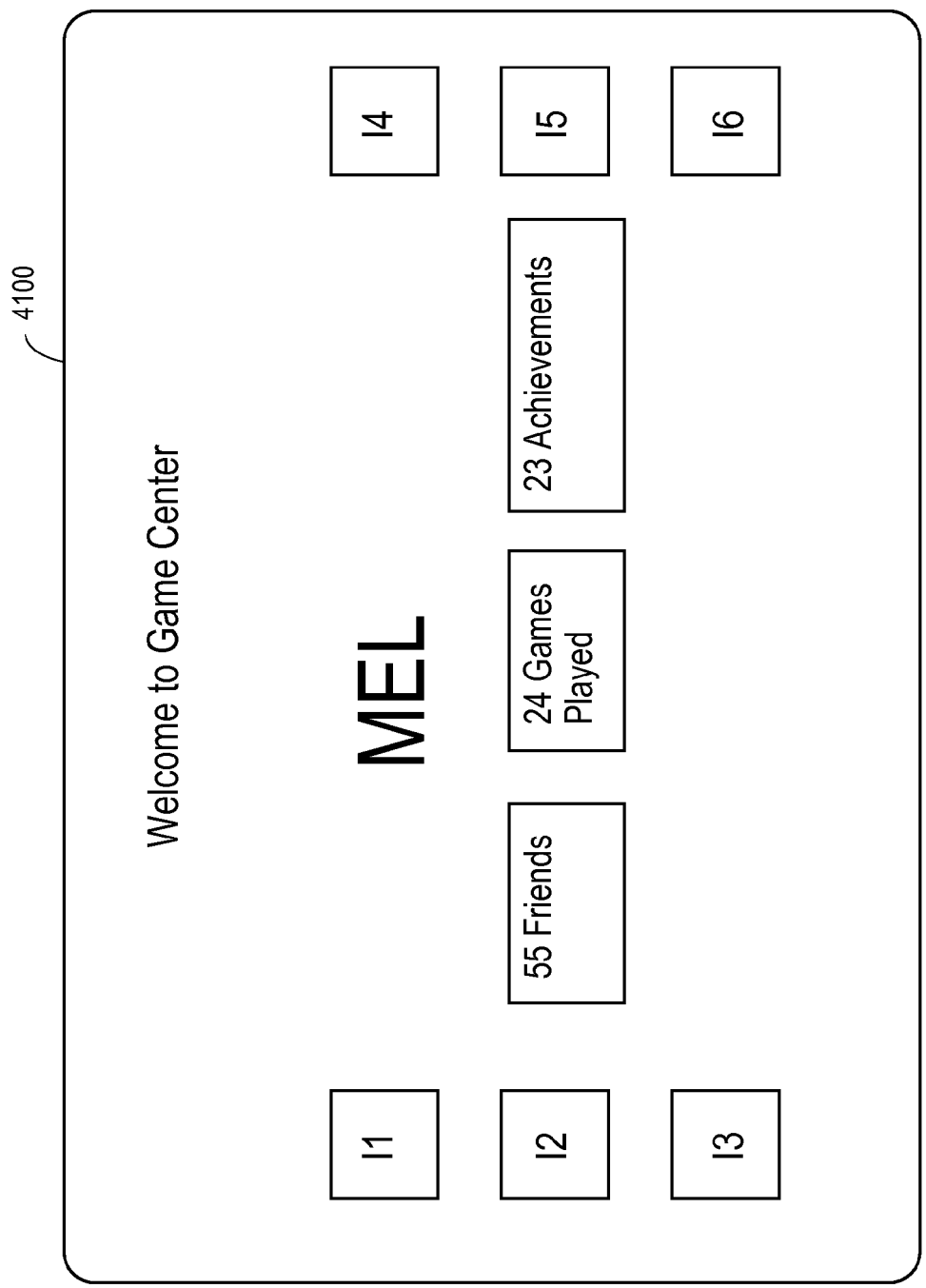

FIG. 41 illustrates a user interface 4100 that displays a welcome screen upon initiating the game center application for a particular user in accordance with one embodiment. The user interface 4100 includes a user name (e.g., Mel), icons for a number of games played by the user, a number of friends, a number of games played (e.g., 24 games played) for the user, and a number of achievements.

Figure 42:
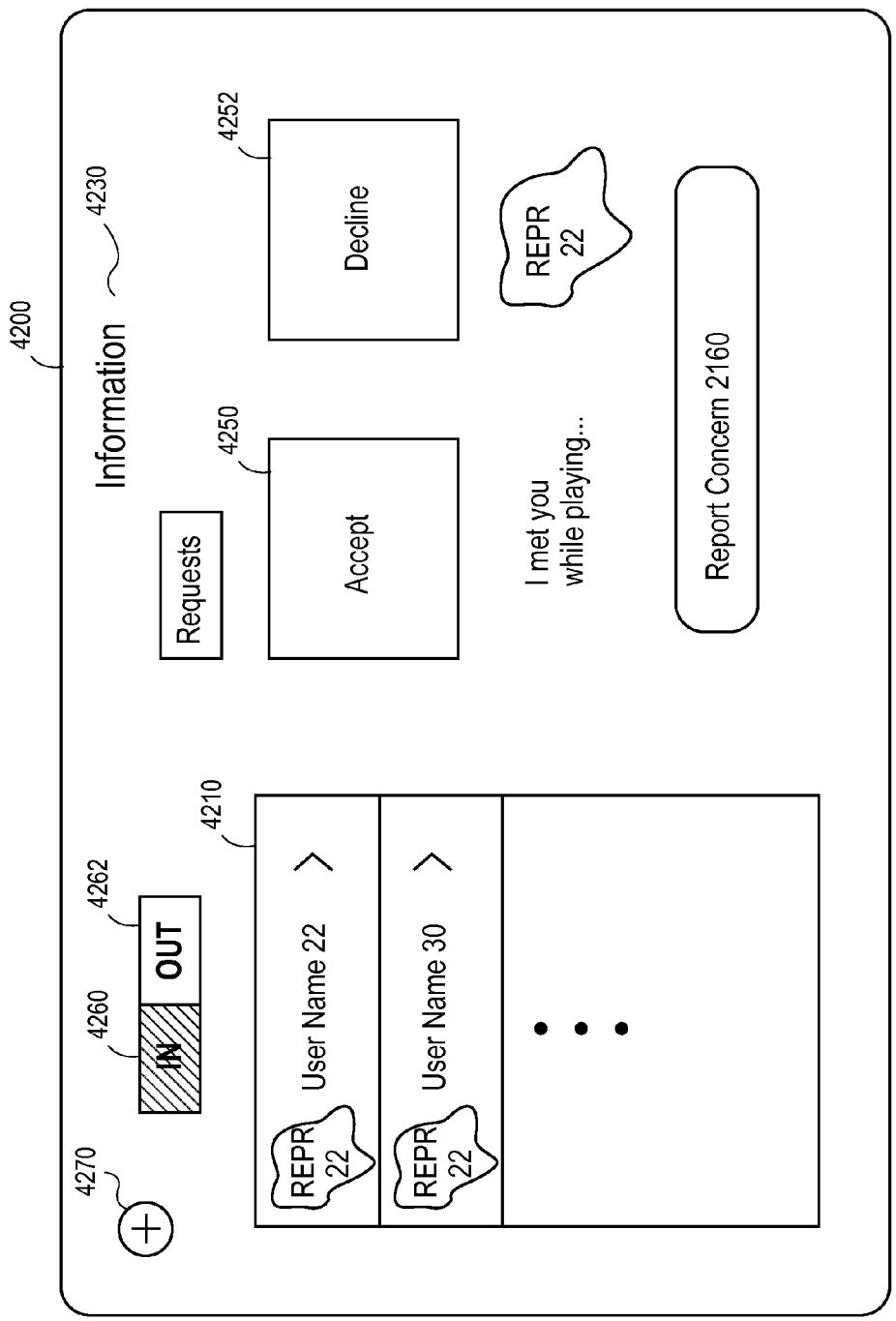

FIG. 42 illustrates a user interface 4200 with a list of notifications (e.g., friend requests) and additional information in accordance with one embodiment. User interface 4200 includes content similar to that of the user interfaces illustrated in FIGS. 21 and 22. The user interface 4200 includes a list of notifications 4210 received or sent by a user. A selection of option 4260 causes the processing logic to generate a list of notifications (e.g., friend requests, updates) received while a selection of option 4262 causes the processing logic to generate a list of notifications (friend requests, updates) sent. A user selection of option 4270 provides a list of the user's contacts and associated contact information (e.g., phone #, email address, URL, address, additional fields, etc.).

In an embodiment, an incoming friend request may be associated with an email address. The user's address book or contact information associated with the user's contacts can be searched to find a match with the email address. If a match occurs, then the incoming friend request will display a real name or nickname for the player who sent the incoming friend request to the user.

In one embodiment, option 4260 is selected and then user name 22 is also selected. Information 4230 includes details regarding the player that sent the friend request such as a representation (e.g., avatar) and a short message from this player. The user interface 4200 also includes an accept option 4250 to accept a request, decline option 4252 to decline a request, and a report a concern option 4260 to report a concern regarding the user name 22. Additional options may also be provided as illustrated and discussed in conjunction with the description of FIG. 22.

In an alternative embodiment, the user interfaces illustrated in FIGS. 37-42 may also be used in mobile phone devices.

FIG. 43 illustrates a desired object 4300 having texture in one embodiment of the present invention. The desired object 4300 includes end components 4302 and 4304 and a component 4306 having texture. This object 4300 may be difficult to create using a repeating method that repeats smaller components to form a larger desired object.

FIG. 44 illustrates a template object 4400 in one embodiment of the present invention. The template object may be an enlarged version of the desired object in one dimension (e.g., a width dimension). Portions of the object 4400 can be selected (or other portions can be blocked or masked) in order to form the desired object 4300. For example, the components 4402, 4406, and 4404 can be selected to form the desired object 4300. The component 4408 is blocked or removed from object 4400. In this manner, various types of objects with texture can be created.

FIG. 45 illustrates an exemplary form 4500 with various input fields 4510-4514 in one embodiment of the present invention. A game developer can easily use the form 4500 or other types of forms and apply texture layers to create customized user interfaces.

Figure 46:
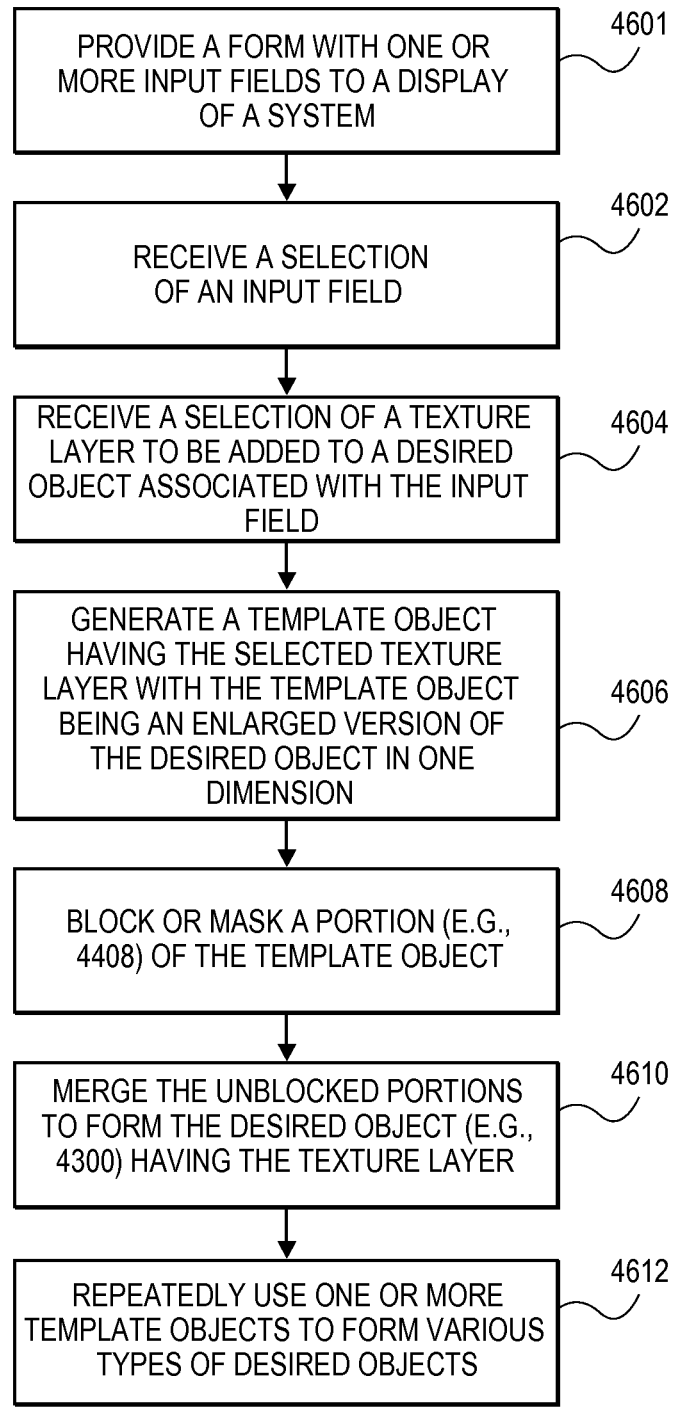
FIG. 46 illustrates an exemplary computer-implemented method for adding texture to objects of user interfaces in one embodiment of the present invention.

FIG. 46 illustrates an exemplary computer-implemented method for adding texture to objects of user interfaces in one embodiment of the present invention. The computer-implemented method 4600 is performed by processing logic that may comprise hardware (circuitry, dedicated logic, etc.), software (such as is run on a general purpose computer system or a dedicated machine or a system), or a combination of both. In one embodiment, the computer-implemented method 4600 is performed by the game center module 200 located on a client system. At block 4601, the processing logic provides a form with one or more input fields to a user interface. At block 4602, the processing logic receives a selection of an input field. At block 4604, the processing logic receives a selection of a texture layer to be added to a desired object associated with the input field. At block 4606, the processing logic generates a template object with the texture layer (e.g., object 4400). The template object may be an enlarged version of the desired object in one dimension (e.g., a width dimension). At block 4608, the processing logic blocks or masks a portion (e.g., 4408) of the extra wide template object. At block 4610, the processing logic merges the unblocked portions to form a desired object (e.g., 4300) having the texture layer. At block 4612, the processing logic repeatedly using one or more template objects to form various types of desired objects in order to create a customized user interface for one or more software applications (e.g., software gaming applications for use with the game center) that are capable of being executed on the system.

Various types of texture layers can be used for forming the desired object 4300 or other types of objects. The texture layer(s) can vary in color, intensity, pattern, etc. across portions of a desired object to create a customized object and user interface.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method comprising:
    receiving a selection of a friends option of a game center module;
    sending data to be presented on a graphical user interface of a system in response to the selection of the friends option, the data indicative of a list of friends;
    receiving a selection of a friend from the list of friends; and
    sending data to be presented on the graphical user interface, the data indicative of details of the selected friend, the details including a first list of games played together for games in common between a user and the selected friend and a second list of other games in common that have not been played together between the user and the selected friend, wherein each friend has an account that is associated with an account of the user.

2. The computer-implemented method of claim 1, wherein the first list of games comprises a separate selectable option for each game and each game of the first list of games displays a respective game name and a comparison of the user's ranking and the selected friend's ranking for the respective game.

3. The computer-implemented method of claim 2, wherein the second list of games comprises a selectable option for each game with each selectable option indicating a respective game name and a comparison of the user's ranking and the selected friend's ranking for the respective game.

4. The computer-implemented method of claim 1, wherein the gaming details of the selected friend further comprises a third list of games owned by the friend and not owned by the user.

5. The computer-implemented method of claim 1, further comprising:
    receiving a selection of an option from the first list of games;
    sending data to be presented to the graphical user interface, the data indicating game details for the selected game;
    receiving a selection of a leaderboard option provided by the game details;
    sending data to be presented to the graphical user interface, the data indicative of a leaderboard that includes a first ranked list of top players and the user among the user's friends for the game associated with the selected option.

6. The computer-implemented method of claim 5, wherein the leaderboard includes a second ranked list of top players and the user among all players for the game associated with the selected option.

7. The computer-implemented method of claim 6, wherein the first ranked list further comprises a ranking for the selected friend for the game associated with the selected option, wherein the rankings of the first ranked list and the second ranked list are also generated based on one of the following time periods: today, this week, and all time, wherein the leaderboard further comprises a number of games played by the user, a number of players in the leaderboard, and a show more option to show an additional number of players.

8. A non-transitory computer-readable medium containing executable computer program instructions which when executed by a computing system cause said system to perform a method, the method comprising:
    receiving a selection of a friends option of a game center module;
    sending data to be presented on a graphical user interface of a system in response to the selection of the friends option, the data indicative of a list of friends;
    receiving a selection of a friend from the list of friends; and
    sending data to be presented on the graphical user interface, the data indicative of details of the selected friend, the details including a first list of games played together for games in common between a user and the selected friend and a second list of other games in common that have not been played together between the user and the selected friend, wherein each friend has an account that is associated with an account of the user.

9. The non-transitory computer-readable medium of claim 8, wherein the first list of games comprises a separate selectable option for each game and each game of the first list of games displays a respective game name and a comparison of the user's ranking and the selected friend's ranking for the respective game.

10. The non-transitory computer-readable medium of claim 8, wherein the second list of games comprises a selectable option for each game with each selectable option indicating a respective game name and a comparison of the user's ranking and the selected friend's ranking for the respective game.

11. The non-transitory computer-readable medium of claim 8, wherein the gaming details of the selected friend further comprises a third list of games owned by the friend and not owned by the user.

12. The non-transitory computer-readable medium of claim 8, the method further comprising:
    receiving a selection of an option from the first list of games;
    sending data to be presented to the graphical user interface, the data indicating game details for the selected game;
    receiving a selection of a leaderboard option provided by the game details;
    sending data to be presented to the graphical user interface, the data indicative of a leaderboard that includes a first ranked list of top players and the user among the user's friends for the game associated with the selected option.

13. The non-transitory computer-readable medium of claim 12, wherein the leaderboard includes a second ranked list of top players and the user among all players for the game associated with the selected option.

14. The non-transitory computer-readable medium of claim 13, wherein the first ranked list further comprises a ranking for the selected friend for the game associated with the selected option, wherein the rankings of the first ranked list and the second ranked list are also generated based on one of the following time periods: today, this week, and all time, wherein the leaderboard further comprises a number of games played by the user, a number of players in the leaderboard, and a show more option to show an additional number of players.

15. A computer-implemented method comprising:
   receiving a selection of a friend from a list of friends provided by a game center module; and
   sending data to be presented on a graphical user interface of a system, the data indicative of details of the selected friend, the details including a first list of games played together for games in common between a user and the friend and a second list of other games in common that have not been played together between the user and the friend, wherein each friend has an account that is associated with an account of the user, and wherein the data for each game on the first list of games includes a game name and a comparison of the user's ranking and the selected friend's ranking for the respective game.

16. The computer-implemented method of claim 15, wherein the data for each game on the second list of games includes a game name and a comparison of the user's ranking and the selected friend's ranking for the respective game.

17. The computer-implemented method of claim 15, further comprising:
   receiving a selection of an option associated with one of the games from the first or second list of games;
   sending data to be presented on the graphical user interface, the data indicative of game details of the selected game;
   receiving a selection of a leaderboard option provided by the game details;
   sending data to be presented on the graphical user interface, the data indicative of a leaderboard that includes a first ranked list of a number of top players including the user if the user is ranked within the number of top players or a number of top players and an additional ranking for the user for the game associated with the selected option if the user is not ranked within the number of top players.

18. The computer-implemented method of claim 17, wherein the leaderboard further includes a second ranked list of top players and the user among all players for the game associated with the selected option.

19. The computer-implemented method of claim 17, wherein the rankings of the leaderboard are generated based on a plurality of games recently played by the user.

20. The computer-implemented method of claim 18, wherein the first ranked list further comprises a ranking for the selected friend for the game associated with the selected option, wherein the rankings of the first ranked list and the second ranked list are also generated based on one of the following time periods: today, this week, and all time, wherein the leaderboard further comprises a number of games played by the user, a number of players in the leaderboard, and a show more option to show an additional number of players.

21. A non-transitory computer-readable medium containing executable computer program instructions which when executed by a computing system cause said system to perform a method, the method comprising:
   receiving a selection of a friend from a list of friends provided by a game center module; and
   sending data to be presented on a graphical user interface of a system, the data indicative of details of the selected friend, the details including a first list of games played together for games in common between a user and the friend and a second list of other games in common that have not been played together between the user and the friend, wherein each friend has an account that is associated with an account of the user, and wherein the data for each game on the first list of games includes a game name and a comparison of the user's ranking and the selected friend's ranking for the respective game.

22. The non-transitory computer-readable medium of claim 21, wherein the data for each game on the second list of games includes a game name and a comparison of the user's ranking and the selected friend's ranking for the respective game.

23. The non-transitory computer-readable medium of claim 21, the method further comprising:
   receiving a selection of an option associated with one of the games from the first or second list of games;
   sending data to be presented on the graphical user interface, the data indicative of game details of the selected game;
   receiving a selection of a leaderboard option provided by the game details;
   sending data to be presented on the graphical user interface, the data indicative of a leaderboard that includes a first ranked list of a number of top players including the user if the user is ranked within the number of top players or a number of top players and an additional ranking for the user for the game associated with the selected option if the user is not ranked within the number of top players.

24. The non-transitory computer-readable medium of claim 23, wherein the leaderboard further includes a second ranked list of top players and the user among all players for the game associated with the selected option.

25. The non-transitory computer-readable medium of claim 23, wherein the rankings of the leaderboard are generated based on a plurality of games recently played by the user.

26. The non-transitory computer-readable medium of claim 24, wherein the first ranked list further comprises a ranking for the selected friend for the game associated with the selected option, wherein the rankings of the first ranked list and the second ranked list are also generated based on one of the following time periods: today, this week, and all time, wherein the leaderboard further comprises a number of games played by the user, a number of players in the leaderboard, and a show more option to show an additional number of players.

27. A system, comprising:
   a computer-readable medium to store a game center module;
   one or more processing units coupled to the computer-readable medium,
   an input/output device coupled to the one or more processing units, wherein the one or more processing units are configured to receive a selection of a friends option of the game center module, to send data to be presented to the input/output device, the data indicative of a list of friends, to receive a selection of a friend from the list of friends, and to send data to be presented to the input/output device, the data indicative of friend details of the selected friend including a first list of games played together for games in common between a user and the selected friend and a second list of other games in common that have not been played together between the user and the selected friend, wherein each friend has an account that is associated with an account of the user.

28. The system of claim 27, wherein the first and second list of games comprises a list of options with each option indicating a respective game name and a set of achievements for the friend while playing the respective game.

29. The system of claim 28, wherein each option also indicates a comparison of a user's ranking and the selected friend's ranking for the respective game.

* * * * *